United States Patent [19]

Nakayama et al.

[11] Patent Number: 5,287,736
[45] Date of Patent: Feb. 22, 1994

[54] MISFIRE DETECTING APPARATUS FOR MULTICYLINDER INTERNAL COMBUSTION ENGINES

[75] Inventors: Masaaki Nakayama, Toyoake; Yasutoshi Baba, Obu; Hideki Morishima, Anjo; Isamu Nomura, Obu; Kouichi Shimizu, Handa; Yasuhito Takasu, Toyohashi, all of Japan

[73] Assignee: Nippondenso Co., Ltd., Kariya, Japan

[21] Appl. No.: 951,200

[22] Filed: Sep. 28, 1992

[30] Foreign Application Priority Data

Sep. 30, 1991 [JP] Japan ................................. 3-251926
Nov. 26, 1991 [JP] Japan ................................. 3-310982
Dec. 2, 1991 [JP] Japan ................................. 3-317942
Aug. 7, 1992 [JP] Japan ................................. 4-211471

[51] Int. Cl.$^5$ ............................................. G01M 15/00
[52] U.S. Cl. ............................................... 73/116
[58] Field of Search ............................... 73/116, 117.3; 364/431.07, 431.08; 123/419, 479, 436; 340/439

[56] References Cited

U.S. PATENT DOCUMENTS 5,041,980 8/1991 Maddock et al. ............ 364/431.07
5,088,318 2/1992 Osawa ............................ 73/117.3
5,095,742 3/1992 James et al. ....................... 73/116

FOREIGN PATENT DOCUMENTS 58-19532 2/1983 Japan .
61-258955 11/1986 Japan .
472450 3/1992 Japan .
4-198834 7/1992 Japan .

Primary Examiner—Robert Raevis
Attorney, Agent, or Firm—Cushman, Darby & Cushman

[57] ABSTRACT

In a misfire detecting apparatus for a multicylinder internal combustion engine, a rotational signal outputting unit outputs a rotary signal at every predetermined rotary angle, and a tentative misfire decision unit tentatively decides, on the basis of the rotary signal, whether or not misfire has occurred in each cylinders of the engine. A tentative misfire number counting unit counts the number of tentative misfires decided for respective cylinders, and a counting result storage unit stores the counting results. After a given number of tentative misfire decisions have been made, it is decided that misfire has actually occurred, only if the counting result, for a part of the cylinders, among the counting results for respective cylinders stored in the counting result storage unit is larger than a predetermined number.

13 Claims, 15 Drawing Sheets

NORMAL COMBUSTION STATE

MISFIRE OCCURRING STATE

NORMAL COMBUSTION STATE

MISFIRE OCCURRING STATE

| ΣCMISn | < X₁ | X₁~X₂ | X₂~X₃ | X₃ < |
|---|---|---|---|---|
| PREDETERMINED VALUE γ | γ₁ | γ₂ | γ₃ | γ₄ |

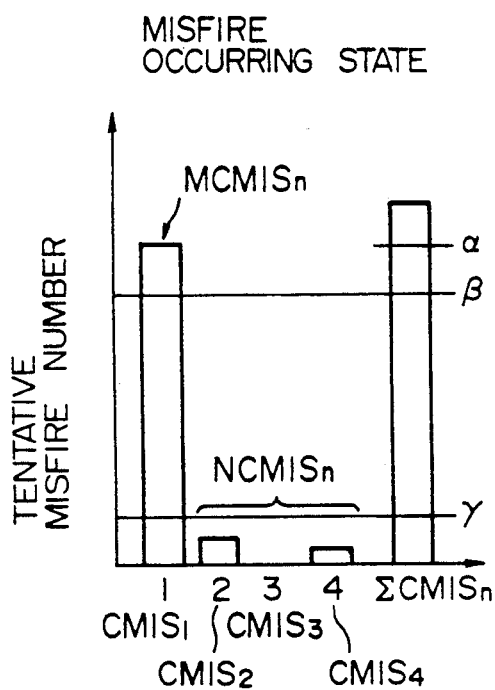
FIG. IIA
MISFIRE OCCURRING STATE
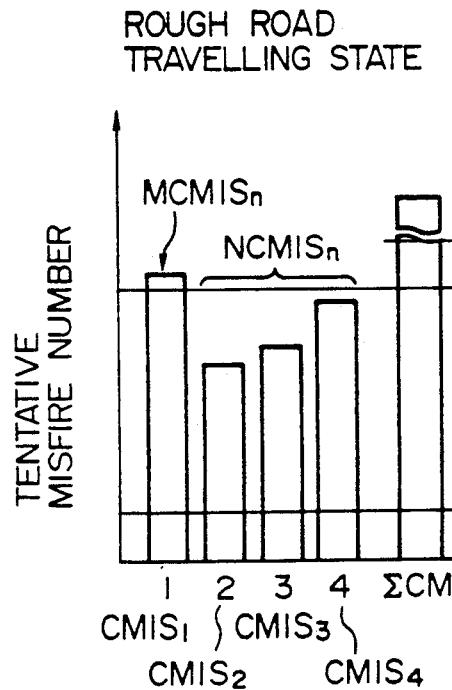
FIG. IIB
ROUGH ROAD TRAVELLING STATE F I G. 18
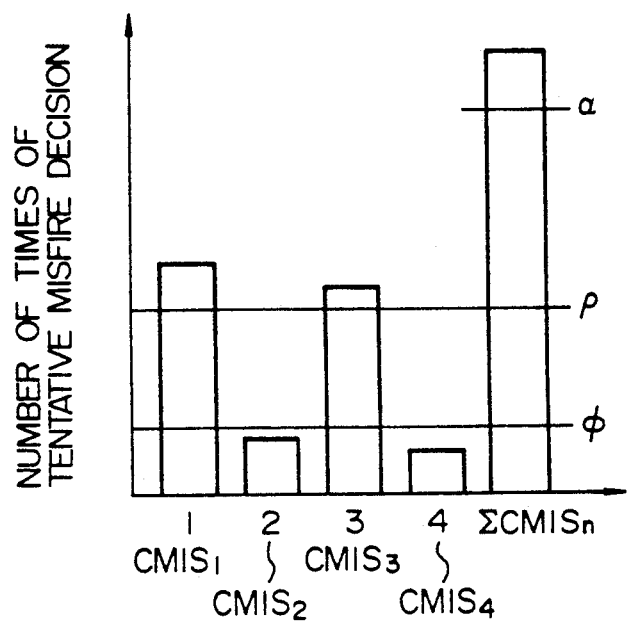
F I G. 20
○ : MISFIRE OF RANDOM CYLINDERS
△ : MISFIRE OF SPECIFIC CYLINDER
× : ROUGH ROAD TRAVELLING STATE
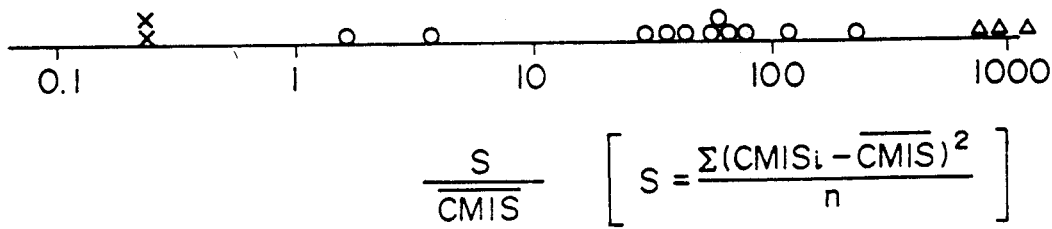
$$\frac{S}{\overline{CMIS}} \quad \left[ S = \frac{\Sigma(CMIS_i - \overline{CMIS})^2}{n} \right]$$

MISFIRE DETECTING APPARATUS FOR MULTICYLINDER INTERNAL COMBUSTION ENGINES

BACKGROUND OF THE INVENTION

The present invention relates to a misfire detecting apparatus for a multicylinder internal combustion engine. The apparatus serves to detect misfire occurring in the internal combustion engine.

A conventional apparatus for detecting misfire occurring in an internal combustion engine is disclosed e.g. in JP-A-61-258,955. This apparatus detects misfire as follows. When misfire occurs, complete combustion cannot be attained in a combustion chamber of an internal combustion engine, so that the rotational speed of the internal engine (hereinafter refereed to as an engine speed) is lowered. Therefore, instantaneous engine speeds at least at two points in a single ignition or firing cycle are detected to obtain a change in the engine speed. A variation of the engine speed change is compared with a misfire detection value set in view of the operating state of the internal combustion engine. When the former becomes larger than the latter, occurrence of misfire is decided. However, the above conventional apparatus has a following problems. When a vehicle runs on a rough road, the contacting state of wheels on a road surface becomes unstable because of unevenness of the road surface. Namely, the vehicle may leave the road surface or contact strongly with the road surface. Thus, the state of a load on the internal combustion engine changes, so that the rotational speed of a crank shaft becomes unstable. As a result, even when misfire does not occur, a variation of the engine speed change may increase. For this reason, even when misfire does not occur actually, the above conventional misfire detecting apparatus may detect erroneously occurrence of misfire, because of unevenness of the road surface.

Further, when the vehicle is decelerated abruptly, the engine speed lowers abruptly. Thus, even when misfire does not occur, a variation of the engine speed change increases, so that occurrence of misfire may be decided erroneously.

SUMMARY OF THE INVENTION

The present invention has been made to solve the above problems.

An object of the present invention is to provide a misfire detecting apparatus which can accurately determine occurrence of misfire even when a vehicle is running on a rough road or in a decelerating state.

In order to attain the above object, the misfire detecting apparatus for an internal combustion engine according to the present invention employs, as shown in FIG. 1, the technical means including:

a rotary signal outputting means for outputting a rotary signal at every predetermined rotary angle in accordance with the rotation of a multicylinder internal combustion engine;

a tentative misfire deciding means for tentatively deciding, for each cylinder, whether or not misfire has occurred in the multicylinder internal combustion engine, on the basis of the output signal from the rotary signal outputting means;

a counting means for counting, for each cylinder, the number of times of the tentative misfire decided by the tentative misfire deciding means;

a counting result storage means for storing, for each cylinder, a counting result of the counting means; and a real misfire deciding means for deciding, after a predetermined number of times of tentative decision have been made, that misfire has actually occurred, if only the counting result for a part of cylinders among the counting results for respective cylinders stored in the counting result storage means is larger than a predetermined number of times.

Further, the misfire detecting apparatus for an internal combustion engine according to the present invention may employ the technical means including a vehicle stop detecting means for detecting whether or not a vehicle is in a stopped state;

a rotary signal outputting means for outputting a rotary signal at every predetermined rotary angle in accordance with the rotation of a multicylinder internal combustion engine;

a tentative misfire deciding means for tentatively deciding, for each cylinder, whether or not misfire has occurred in the multicylinder internal combustion engine, on the basis of the output signal from the rotary signal outputting means;

a counting means for counting, for each cylinder, the number of times of the tentative misfire decided by the tentative misfire deciding means;

a counting result storage means for storing, for each cylinder, a counting result of the counting means; and a real misfire deciding means for deciding, in a state where the vehicle is not in a stopped state, on the basis of the detection result of the vehicle stop detecting means, after a predetermined number of times of tentative decision have been made, that misfire has actually occurred, if only the counting result for a part of cylinders among the counting results for respective cylinders stored in the counting result storage means is larger than a predetermined number of times, and for deciding, in a state where the vehicle is in a stopped state, that misfire has actually occurred, if the counting result for at least one cylinder among the counting results for respective cylinders stored in the counting result storage means is larger than a predetermined number of times.

In accordance with the present invention, whether or not misfire has occurred in the multicylinder internal combustion engine is tentatively decided for each cylinder on the basis of the rotary signal outputted at every predetermined rotary angle in accordance with the rotation of the multicylinder combustion engine. Then, if it is decided that misfire has occurred, the number of times of decision of occurrence of misfire is counted for each cylinder by the counting means, and the counting result is stored in the counting result storage means. After a predetermined number of times of tentative misfire decision are executed, it is decided that misfire has actually occurred, if only the counting result for a part of cylinders among the counting results for respective cylinders stored in the counting result storage means is larger than a predetermined number of times.

Further, in an alternative way, whether or not a vehicle stops is in a stopped state is detected. In a state where the vehicle is not in a stopped state, it is decided that misfire has actually occurred, if only the counting result for a part of cylinders among the counting results for respective cylinders stored in the counting result storage means is larger than a predetermined number of times, and, in a state where the vehicle is in a stopped state, it is decided that misfire has actually occurred, if the counting result for at least one cylinder among the counting results for respective cylinders stored in the counting result storage means is larger than a predetermined number of times.

BRIEF DESCRIPTION OF THE DRAWINGS

FIGS. 5A and 5B show respective characteristics when the internal combustion engine is in a normal combustion state and when it misfires, respectively;

FIGS. 11A and 11B are graphs showing the characteristics of the tentative misfire counter $CMIS_n$ for use in a detailed explanation of the misfire detecting operation shown in FIG. 7, and FIGS. 11A and 11B show respective characteristics when the internal combustion engine is in a normal combustion state and when it misfires, respectively;

FIG. 18 is a graph showing the characteristic of the tentative misfire counter $CMIS_n$ used for a detailed explanation of the misfire detecting operation shown in FIG. 17;

FIG. 20 is an explanatory drawing for use in a detailed explanation of the flowchart shown in FIG. 19.

DESCRIPTION OF THE PREFERRED EMBODIMENTS

Figure 1:
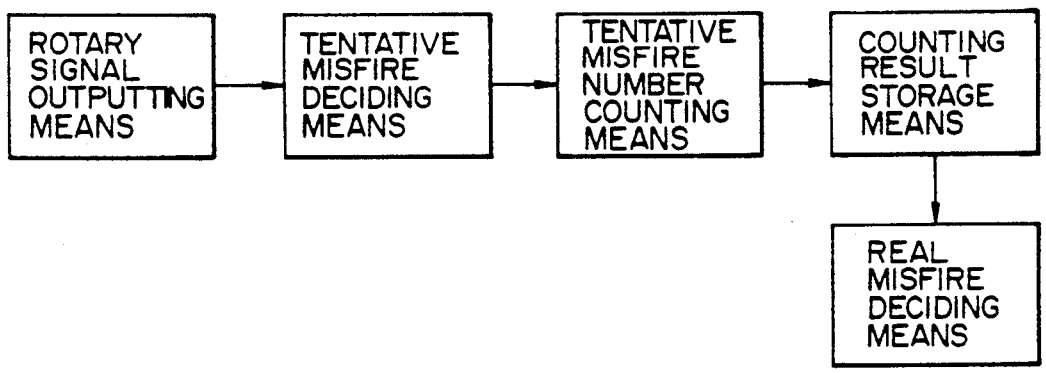
FIG. 1 is a functional block diagram of the present invention.

Now referring to the drawings, the present invention will be explained with respect to several embodiments shown therein.

Figure 2:
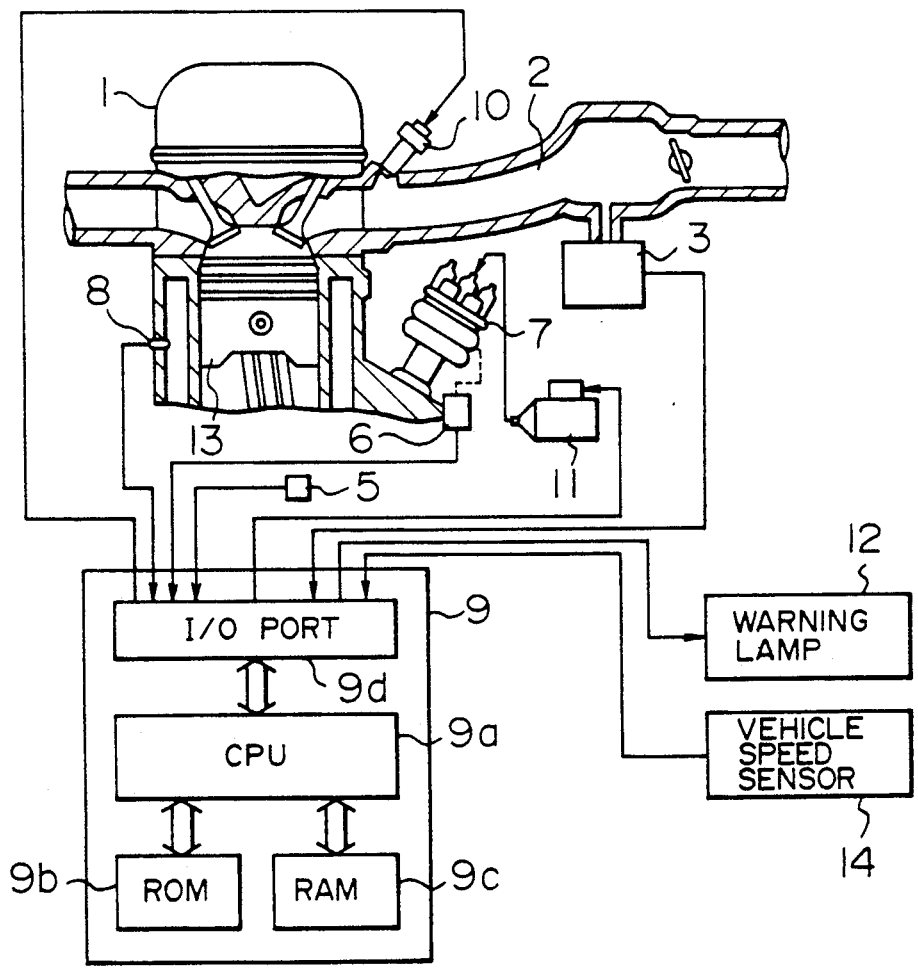
FIG. 2 is a block diagram showing the entire configuration of the apparatus according to an embodiment of the present invention.

FIG. 2 is a structural drawing showing the general structure of the apparatus of one embodiment of the present invention.

In FIG. 2, reference numeral 1 denotes an internal combustion engine which has four cylinders in this embodiment. Reference numeral 2 denotes an intake manifold for introducing air from an air cleaner (not shown) into the internal combustion engine. Reference numeral 3 denotes an intake manifold pressure sensor for detecting or sensing the pressure within the intake manifold. The detection signal from the sensor 3 is supplied to an electronic control unit 9 described later.

Reference numeral 5 denotes a rotary angle sensor serving as a rotary signal outputting means which is attached to a crank shaft (not shown) of the internal combustion engine and produces a signal at every predetermined crank angle (30° CA in this embodiment) in accordance with the rotation of the internal combustion engine 1 which signal is used to obtain a rotational speed Ne of the internal combustion engine 1 (hereinafter referred to as an engine speed). Reference numeral 6 denotes a reference position sensor which is disposed in a distributor 7 and produces a signal for discriminating engine cylinders, specifically it produces a signal at every predetermined timing (top dead center), that is, when the piston 13 of a first cylinder has reached an uppermost position. The detection signals from the rotary angle sensor 5 and the reference position sensor 6 are supplied to the electronic control unit 9 described later.

Reference numeral 8 denotes a water temperature sensor which is arranged in the cooling water path of the internal combustion engine 1 and serves to detect the temperature of the cooling water. The detection signal from the water temperature sensor 8 is also supplied to the electronic control unit 9 described later.

Reference numeral 9 denotes a known electronic control unit (hereinafter referred to as ECU for short) which calculates optimum control amounts for a fuel supply system and an ignition system on the basis of the detecting signals from the above respective sensors to produce control signals for accurately controlling an injector 10, an igniter 11, etc.

The ECU 9 is composed of a known CPU 9a for performing arithmetic processing, an read-only memory (ROM) 9b for storing a control program and control constants necessary for the processing, a RAM 9c serving as a counting result storage means which temporarily stores calculated data while the CPU 9a is in operation, and an I/0 port 9d for transferring signals from and to the exterior of the ECU 9.

Further, the ECU 9 serves: as a tentative misfire deciding means which calculates a change $\Delta\omega_n$ in the engine speed on the basis of the detection signal from the rotary angle sensor 5 using the technique described later, thereby deciding tentatively, on the basis of the calculation result, whether or not the internal combustion engine 1 misfires; as a counting means for counting the number of times of the tentative decision of the occurrence of misfire in each cylinder; and as a real misfire detecting means which decides the occurrence of actual misfire in the internal combustion engine on the basis of the counting result of the counting means.

Reference numeral 12 denotes a warning lamp for notifying a driver and others of the occurrence of misfire when the ECU 9 decides that misfire has occurred. Reference numeral 14 denotes a vehicle speed sensor (vehicle stop detecting means) which detects a vehicle speed through the rotation of a speed meter cable (not shown) and also detects whether or not the vehicle is in a stopped state. The detection signal from vehicle speed sensor 14 is also supplied to the ECU 9 and is used in the tentative decision on the occurrence of misfire and so on described later.

The ECU 9 also serves: as a means for calculating a change $\Delta\omega$ in the engine speed of the internal combustion engine on the basis of the detection result of the above rotary angle sensor 5; a means for calculating an index indicative of a degree of dispersion from the distribution of changes in the engine speed; and as a means for obtaining a misfire decision reference value used in the tentative decision on the occurrence of misfire on the basis of the calculated index.

Figure 3A:
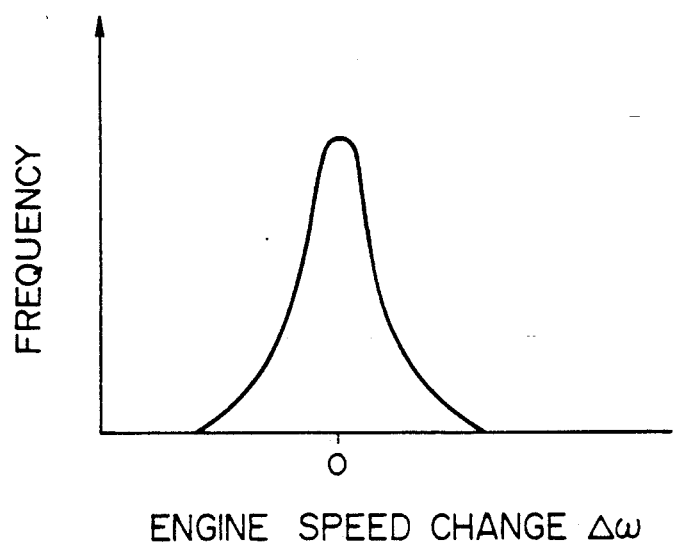
FIGS. 3A and 3B are characteristic diagrams showing the distribution of changes $\Delta\omega$ of an engine speed when the internal combustion engine is in a normal combustion state.
Figure 3B:
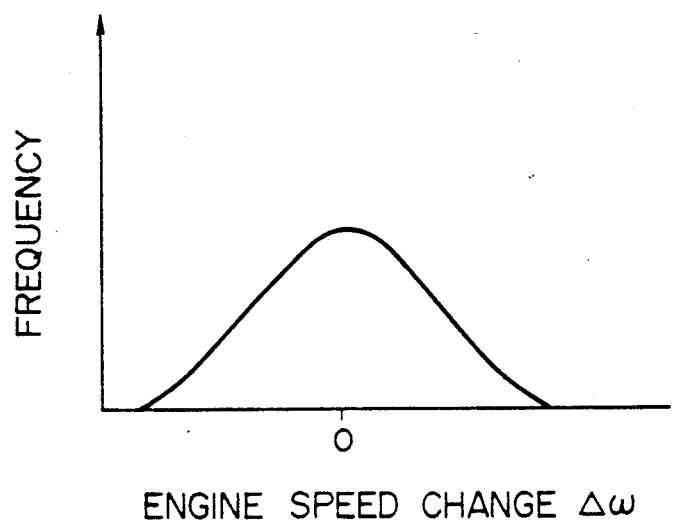

An explanation will be given of a manner of obtaining a misfire decision reference value in the ECU 9. FIGS. 3A and 3B show the distribution of frequency of a plurality of detected engine speed changes $\Delta\omega$ for all cylinders when the internal combustion engine 1 does not misfire and is in a normal combustion state (the method of calculating engine speed changes will be described later). Ideally speaking, if misfire does not occur in each cylinder, the change $\Delta\omega$ in the engine speed takes a value close to zero. However, actually, e.g. since the combustion characteristics of a particular cylinder is different from those of the other cylinders, the changes $\Delta\omega$ in the engine speed has a normal distribution centering around zero as shown in FIGS. 3A and 3B. A certain internal combustion engine has a distribution form as shown in FIG. 3A, while, another internal combustion engine has a different distribution form as shown in FIG. 3B. Thus, different internal combustion engines have different normal distribution forms, since combustion characteristics differ for every engine.

In order to decide misfire accurately, therefore, it is necessary to obtain a misfire decision reference value considering a dispersion of the changes $\Delta\omega$ in the engine speed. In view of the above, the inventors of the present invention obtained a dispersion degree in the distribution of changes in the engine speed when the engine is in a normal combustion state, as shown in FIGS. 3A and 3B, and obtained a misfire decision reference value on the basis thereof. Thus, the inventors could find the method of setting a misfire decision reference value considering a dispersion of engine speed changes for every internal combustion engine and for every engine cylinder. A detailed explanation will be given of the method of setting a misfire decision reference value.

First, an explanation will be given of the method of deciding whether or not each cylinder of the internal combustion engine 1 is in a normal combustion state.

Figure 4A:
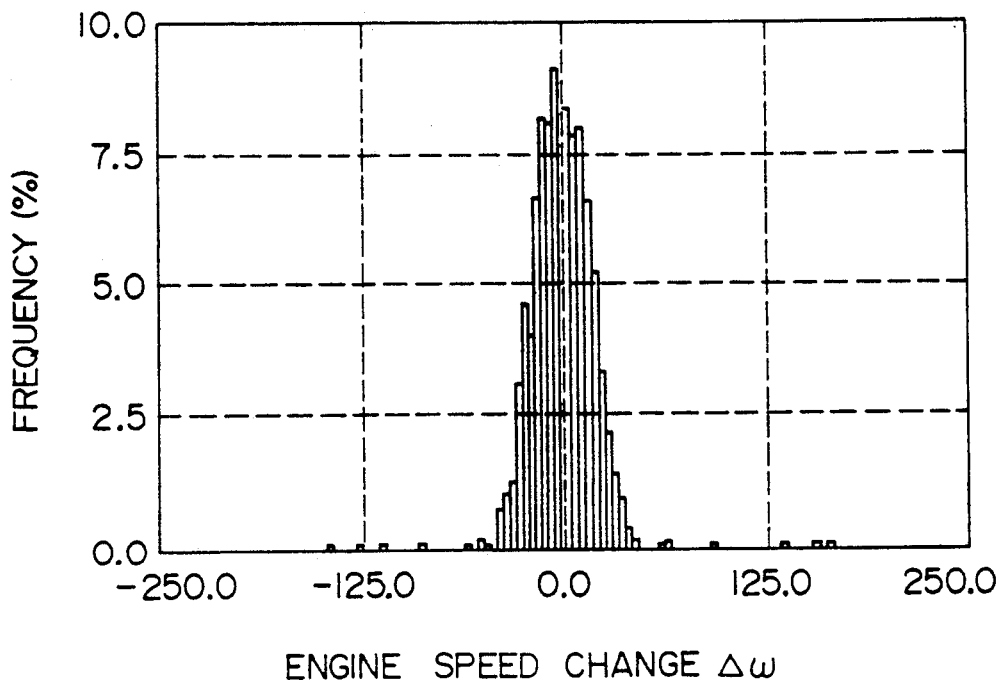
FIGS. 4A and 4B are characteristics diagrams showing the frequency of changes $\Delta\omega$ of an engine speed when the internal combustion engine in a normal combustion state and when it misfires, respectively.
Figure 4B:
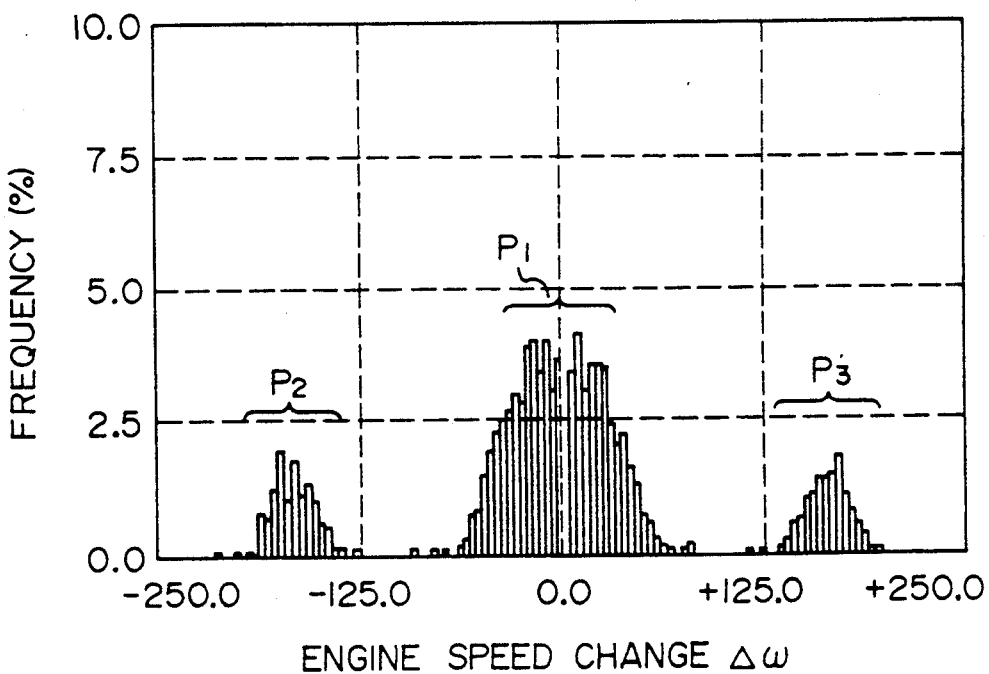

FIGS. 4A and 4B show the combustion characteristics of an internal combustion engine obtained by detecting a large number of detected changes $\Delta\omega$ in the engine speed and by effective sampling for every value of engine speed changes $\Delta\omega$, specifically by sampling engine speed changes $\Delta\omega$ for all engine cylinders when the internal combustion engine has rotated 200 times in total. In FIGS. 4A and 4B, the abscissa represents changes $\Delta\omega$ in the engine speed, and the ordinate represents the frequency of engine speed changes $\Delta\omega$s which have been actually detected. FIG. 4A shows the characteristics when the engine is in a normal combustion state, and FIG. 4B shows the characteristics when the engine is not in a normal combustion state due to occurrence of misfire sometimes among a large number of detected engine speed changes $\Delta\omega$.

As seen from FIGS. 4A and 4B, when the engine is in a normal combustion state, engine speed changes $\Delta\omega$ have a normal distribution pattern centering around zero (the center value) On the other hand, when the engine is not in a normal combustion state, engine speed changes $\Delta\omega$ have three distribution patterns, centering around zero (P1), centering around $-150$ (P2) and centering around $+150$ (P3). Namely, since engine speed changes $\Delta\omega$ for an engine cylinder, in which misfire occurs, become great, by sampling a large number of engine speed changes $\Delta\omega$, it is possible to obtain such distributions P2 and P3.

Figure 5A:
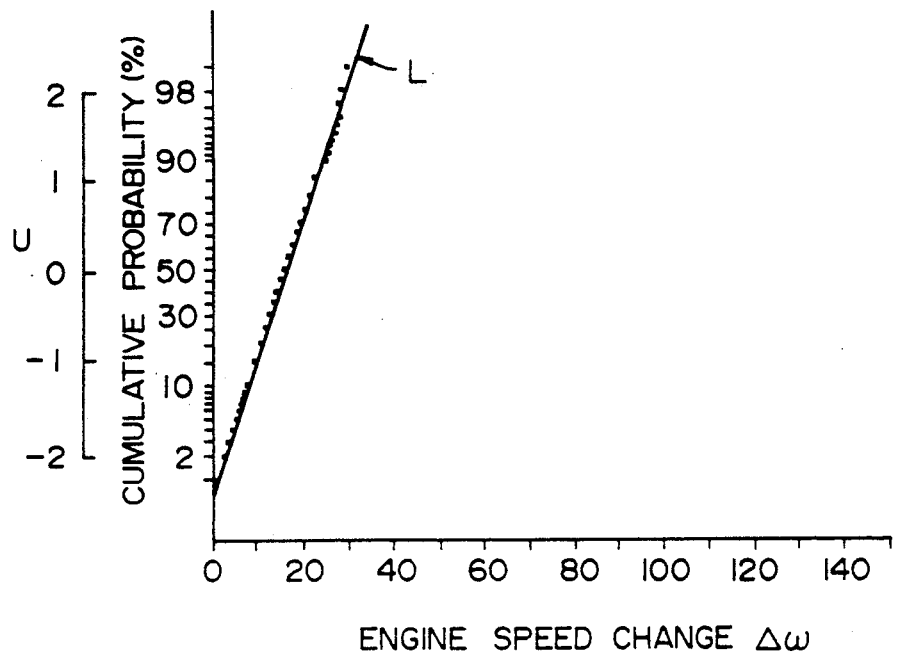
FIGS. 5A and 5B are characteristic diagrams showing the characteristics of FIGS. 3A and 3B rewritten on normal probability papers, respectively.
Figure 5B:
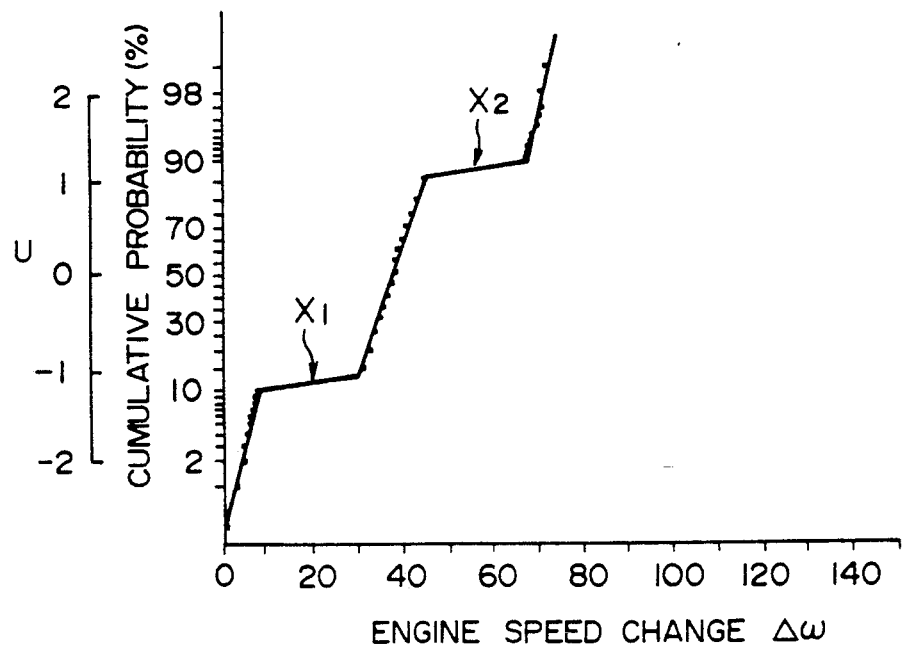

Further, rewriting the distribution patterns of FIGS. 4A and 4B on well-known normal probability papers with the ordinate indicating a cumulative probability results in the characteristic diagrams shown in FIGS. 5A and 5B. FIGS. 5A and 5B can further clarify a difference in the characteristics between a normal combustion state and a misfire occurring state. Specifically, in the normal combustion state, a large number of sampled engine speed changes $\Delta\omega$s are plotted on a substantially straight line (line L in FIG. 5A). On the other hand, in the abnormal combustion state, such plotting cannot be effected. In this case, there appear portions on the normal probability paper where the cumulative probability does not change, but such portions remain parallel to the abscissa (X1 and X2 in FIG. 5B). As a result, it will be seen that whether or not the internal combustion engine is in a normal combustion state can be decided depending on which distribution patterns of FIGS. 5A and 5B the distribution characteristics of engine speed changes $\Delta\omega$ have.

Referring to the flowcharts of FIGS. 6 and 7, a detailed explanation will be given of a method of deciding occurrence of misfire.

Figure 6:
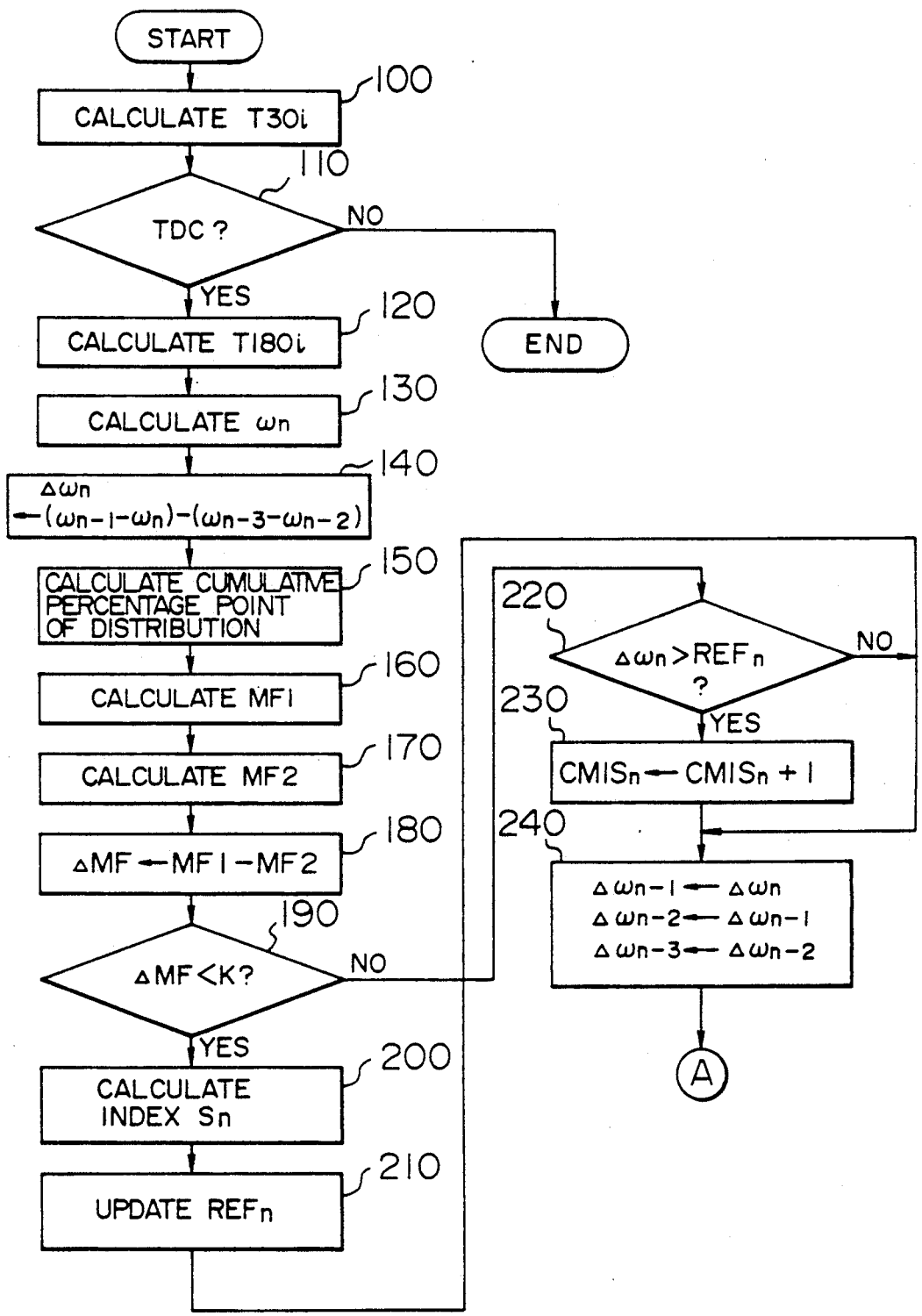
FIG. 6 is a flowchart for explaining the tentative misfire detection operation in a first embodiment of the present invention.
Figures 7, 10:
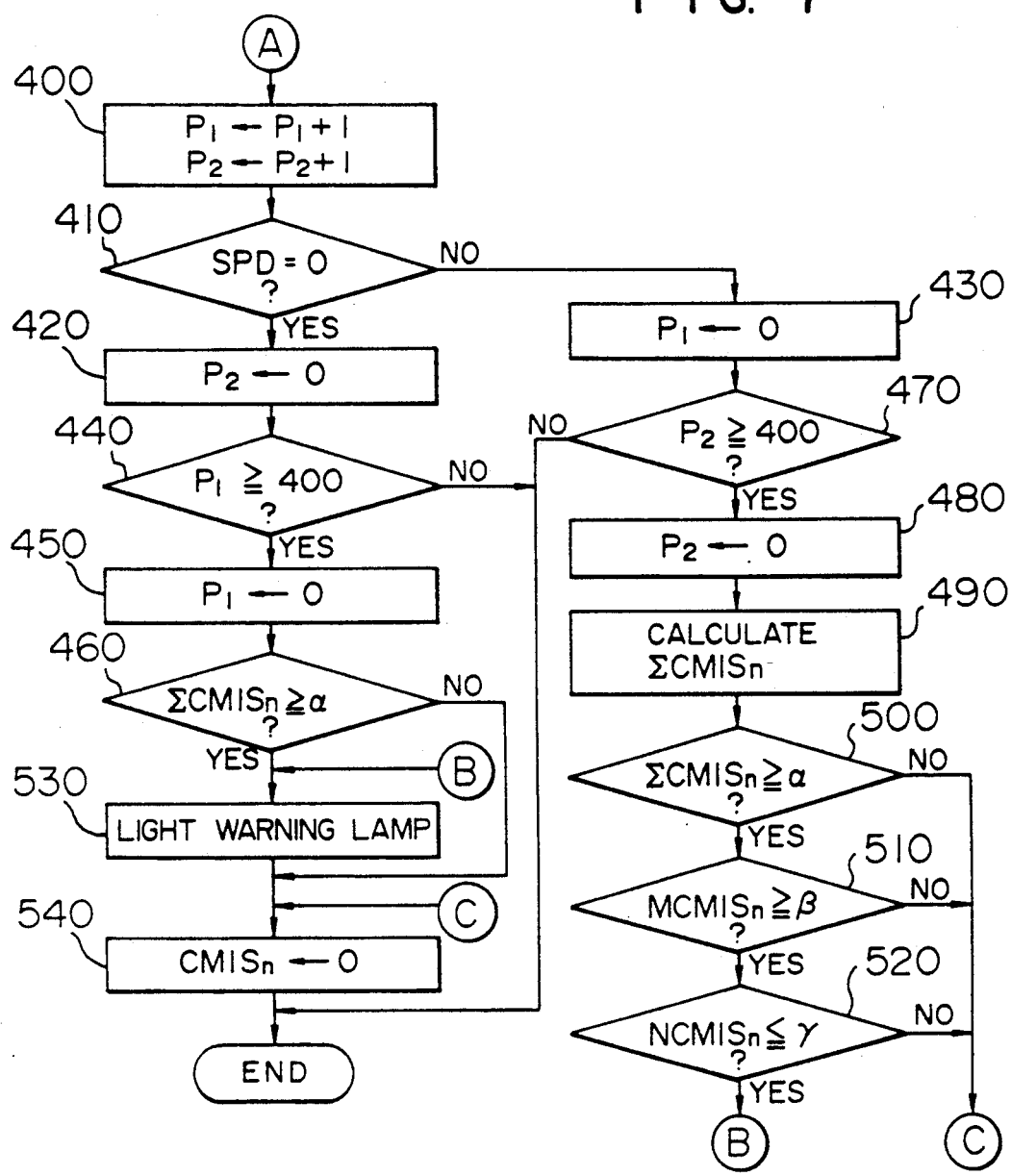
FIG. 7 is a flowchart for explaining the real misfire detecting operation in the first embodiment of the present invention.
FIG. 10 shows a table for setting a predetermined value $\gamma$.

FIGS. 6 and 7 are flowcharts showing the operation of the misfired detection processing performed in the ECU 9. The routines of these flowcharts are processed respectively by interruption processings performed at every predetermined rotary angle (e.g. 30° CA). Of these figures, FIG. 6 is directed to the tentative misfire decision, and FIG. 7 is directed to the real misfire decision.

First, in step 100 in FIG. 6, a difference in the interruption timing between a previous routine and the present routine is obtained to calculate the time T30i required for the engine rotation through the crank angle 30° CA. In step 110, whether or not the present timing is a top dead center (TDC) is decided. If it is not TDC, the routine ends. If it is TDC, the misfire decision processing of step 120 and the following will be executed.

In step 120, data for preceding six times the time T30i required for the engine rotation of 30° CA calculated in step 100 are accumulated to calculate the time T180i required for the engine rotation of 180° CA (since this embodiment is concerned with an internal combustion engine having four cylinders, the time T180i required for the engine rotation of 180° CA was calculated. In the case of an internal combustion engine having six cylinders, data for preceding four times the time T30i required for the engine rotation of 30° CA calculated in step 100 may be accumulated to calculate the time T120i required for the engine rotation of 120° CA).

Step 130 calculates an average rotational speed $\omega_n$ during the crank angle 180° CA. Specifically, a reciprocal of the time T180i calculated in step 120 is taken as an average rotational speed $\omega_n$.

In step 140, a change $\Delta\omega_n$ in the average rotational speed (engine speed change $\Delta\omega$) is calculated by the following equation (1)

$$\Delta\omega_n = (\omega_{n-1} - \omega_n) - (\omega_{n-3} - \omega_{n-2}) \quad (1)$$

Here, in the case of a six cylinder internal combustion engine, the average rotating speed change $\Delta\omega_n$ (engine speed change $\Delta\omega$) is calculated by the following equation (2)

$$\Delta\omega_n = (\omega_{n-1} - \omega_n) - (\omega_{n-4} - \omega_{n-3}) \quad (2)$$

where $\omega_n$ represents the present average rotational speed calculated in step 130; $\omega_{n-1}$ represents the previous rotational speed; $(\omega_{n-1} - \omega_n)$ represents an engine speed change between two cylinders having successive explosion strokes; $\omega_{n-3}$ represents an average rotational speed three times before; and $\omega_{n-4}$ represents an average rotational speed four times before.

Steps 150 to 190 are processing steps for deciding whether or not the internal combustion engine 1 is making the normal rotation In step 150, cumulative percentage points (cumulative 50, 66 and 90 percentage points) in the distribution of average rotating speed changes $\Delta\omega_n$ are calculated (the calculating method will be described later in detail). In step 160, a first calculation value MF1 is calculated on the basis of the cumulative percentage points ($\Delta\omega_{50}$ indicative of the cumulative 50 percentage point and $\Delta\omega_{66}$ indicative of the cumulative 66 percentage point) by the following equation (3)

$$MF1 = [u(66) - u(50)]/(\Delta\omega_{66} - \Delta\omega_{50}) \quad (3)$$

Here, u(50) and u(66) are values corresponding to the cumulative 50 percentage point and the cumulative 66 percentage point. Specifically, u(P) is a u-value whose upper probability is $(1-P)\%$. The u-value, which is a value corresponding to a ratio of a deviation in the normal distribution to the standard deviation, can be calculated by the following equation (4)

$$u = (x - \mu)/\sigma \quad (4)$$

where $x = \Delta\omega$, $\mu$ is the average value of $\Delta\omega$, and $\sigma$ is the standard deviation of $\Delta\omega$.

The values $\Delta\omega_{50}$ and $\Delta\omega_{66}$ are calculated in step 150 and will be describe later in detail.

In step 170, the same processing as in step 160 is carried out to calculate a second calculation value MF2 by the following equation (5)

$$MF2 = [u(90) - u(66)]/(\Delta\omega_{90} - \Delta\omega_{66}) \quad (5)$$

In step 180, a difference $\Delta MF$ between the first calculation value MF1 and the second calculation value MF2 is calculated. In step 190, the difference $\Delta MF$ is compared with a predetermined value K. If $\Delta MF$ is smaller than K, it is decided that the internal combustion engine 1 is in a normal combustion state, and the processing proceeds to step 200. On the other hand, if $\Delta MF$ is not smaller than K, the processing proceeds to step 220.

Figure 8:
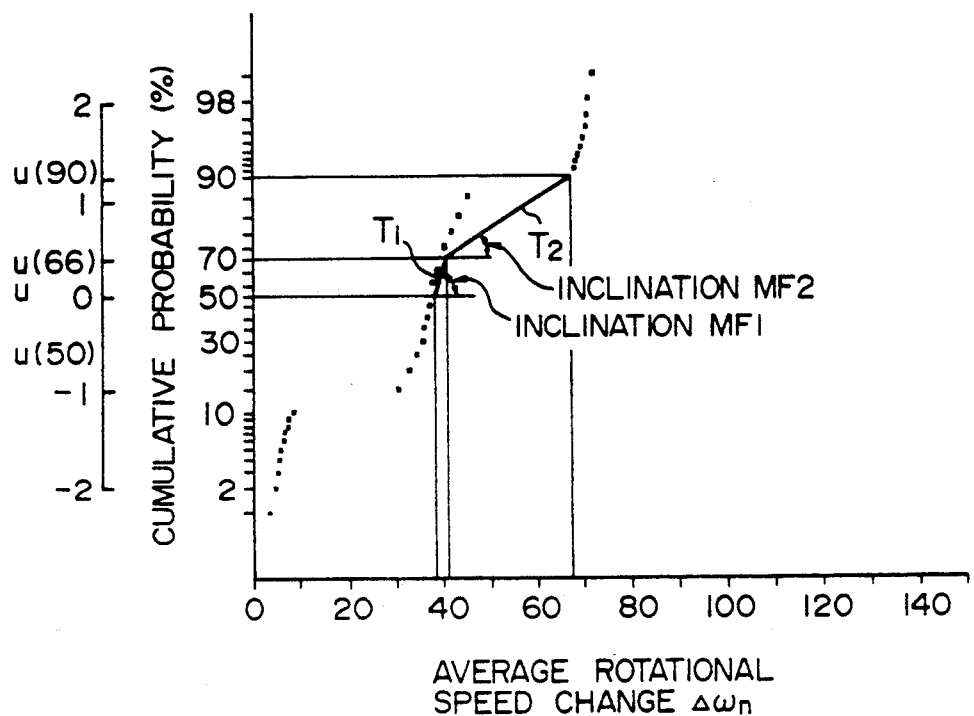
FIG. 8 is a characteristic diagram used for a detailed explanation of the flowchart shown in FIG. 6.

Further, referring to FIG. 8, a more detailed explanation will be given of the processing for deciding whether or not the internal combustion engine 1 is in a normal combustion state. The first calculation value MF1 represents an inclination of the straight line T1 shown in FIG. 8, and the second calculation value MF2 represents an inclination of the straight line T2 shown in FIG. 8. If the engine is in a normal combustion state, the cumulative probability can be expressed by a substantially straight line as described above. This means that the inclination of the straight line T1 and that of the straight line T2 are equal to each other, i.e., the first and second calculation values MF1 and MF2 have substantially equal values. Therefore, if the engine is in a normal combustion state, the difference $\Delta MF$ calculated in step 180 has a value near zero. On the other hand, if the engine is not in a normal combustion state, the values of MF1 and MF2 differ from each other as seen from FIG. 8, so that $\Delta MF$ does not have a value near zero. If the difference $\Delta MF$ is calculated in this way, it is seen that FIG. 8 illustrates a characteristic of the average rotational speed change $\Delta\omega_n$ versus the cumulative percentage point when the engine is not in a normal combustion state. Further, the above predetermined value is set to a value near zero.

Returning to FIG. 6, in step 200, an index $S_n$ corresponding to the standard deviation $\sigma$ of the distribution for an engine cylinder, whose average rotational speed change $\Delta\omega_n$ have been obtained this time, is calculated. In step 210, the misfire decision reference value REFn for an engine cylinder, whose average rotational speed change is $\Delta\omega_n$, is updated by the following equation (6). The method of setting the value of $S_n$ will be explained later in detail.

$$REFn = \Delta\omega_n + M \times S_n \quad (6)$$

where n is a cylinder number (n = 1 to 4, since this embodiment relates to a four cylinder internal combustion engine). M is a constant related to misfire detection precision. If the constant M is 3, then the misfire decision reference value REFn is set to the upper $3\sigma$ point in the distribution of changes $\Delta\omega_n$ in the average rotational speed. In this embodiment, the constant M is assumed to be 4. After the processing of step 210 is executed, the processing proceeds to step 240 without executing the misfire decision processing of step 220, since it has been already decided in step 190 that the internal combustion engine 1 is in a normal combustion state.

In step 220, the average rotational speed change $\Delta\omega_n$ obtained in step 140 is compared with the misfire decision reference value REFn for the associated engine cylinder. If $\Delta\omega_n > REFn$, it is decided that the n-th cylinder misfires, and the processing proceeds to step 230 where the tentative misfire counter $CMIS_n$ is incremented ($CMIS_n \leftarrow CMIS_n + 1$). The tentative misfire counter $CMIS_n$, which is provided for each cylinder, counts the number of times of decision that $\Delta\omega_n > REFn$ holds in the above misfire decision made for each engine cylinder, and stores a result of counting in the RAM 9c. Since this embodiment relates to a four cylinder internal combustion engine, four misfire counters $CMIS_n$ in total are provided (n represents a cylinder number, and n = 1 to 4 in this embodiment).

Since it is possible to detect which cylinder misfires in step 220, it may be possible to inform a driver of an engine cylinder, in which misfire occurs, by providing the warning lamp 12 with a different lighting interval at the time of making a real misfire decision described later. If it is decided that $\Delta\omega_n$ is not larger than REFn in step 220, the processing skips over step 230 by deciding that the associated engine cylinder does not misfire, and proceeds to step 240.

In step 240, the present average rotational speed change $\Delta\omega_n$ is updated to the last average rotational speed change $\Delta\omega_{n-1}$, $\Delta\omega_{n-1}$ is updated to the average rotational speed change before last $\Delta\omega_{n-2}$, and $\Delta\omega_{n-2}$ is updated to the average rotational speed change three times ago $\Delta\omega_{n-3}$. Thereafter, the processing proceeds to the real misfire decision routine shown in FIG. 7. Incidentally, when the equation (2) is used in a six cylinder internal combustion engine, in step 240, $\Delta\omega_{n-3}$ is also updated to the average rotational speed change four times ago $\Delta\omega_{n-4}$.

Figure 9:
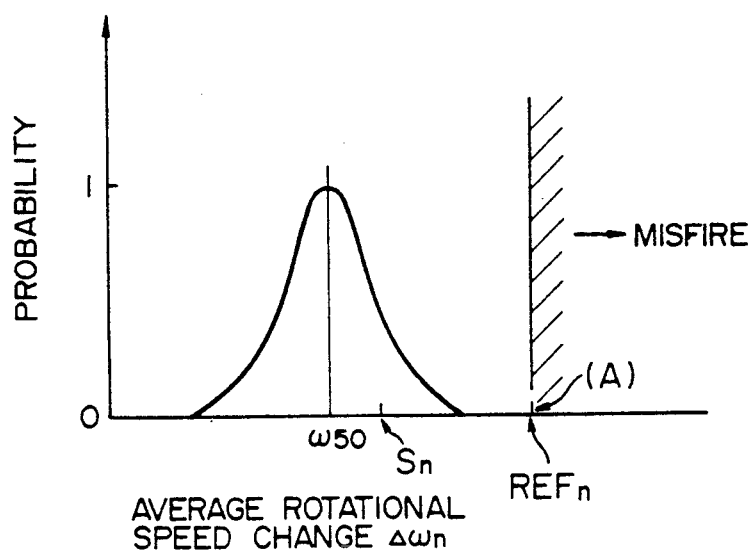
FIG. 9 is another characteristic diagram used for a detailed explanation of the flowchart shown in FIG. 6.

An explanation is made of the tentative misfire deciding method in step 220. The misfire decision reference value REFn, which is set as shown in the equation (6), has a value as shown by (A) in FIG. 9. Therefore, if $\Delta\omega_n > $ REFn holds, the average rotational speed change $\Delta\omega_n$ is not contained in the distribution at the time of a normal combustion, so that it can be decided that the associated engine cylinder misfires. Further, in an internal combustion engine having a large dispersion of the average rotational speed change $\Delta\omega_n$ even in a normal combustion state as shown in FIG. 3B, since the misfire decision reference value REFn is set on the basis of the index $S_n$ corresponding to the standard deviation $\sigma$ of the distribution, the misfire decision reference value REFn is set to a larger value than that of the internal combustion engine having combustion characteristics as shown in FIG. 3A. This assures accurate misfire detection without making an erroneous decision that misfire occurs, in spite that no misfire occurs actually.

The processing proceeds to the real misfire decision shown in FIG. 7. In step 400, counters P1 and P2 are incremented. The counter P1 counts the number of times of ignition when the vehicle speed is zero (i.e. the vehicle is in a stopped state), and the counter P2 counts the number of times of ignition when the vehicle speed is not zero (i.e. the vehicle is travelling).

In step 410, it is decided on the basis of the information from the vehicle speed sensor 14 whether or not the vehicle speed SPD=0 (i.e. whether the vehicle is in a stopped state). If SPD=0, the processing proceeds to step 420, while, if SPO is not zero, the processing proceeds to step 430.

In step 420, the counter P2 is reset. Namely, since the vehicle is in a stopped state at present, the counter P2, which operates when the vehicle is travelling, is always maintained at zero.

In step 440, it is decided whether or not the value of the counter P1 is not smaller than a predetermined number of times (400 times in this embodiment). If it is smaller than the predetermined number of times, this routine is ended. If not so, the processing proceeds to step 450 where the counter P1 is reset. In other words, through the processing of the steps of 420 to 450, the misfire decision processing described later will be executed only when the vehicle continues to stop until the count of the counter P1 reaches the predetermined number of times.

In step 460, it is decided whether the count value $\Sigma CMISn$ of the tentative misfire counter CMISn is larger than a predetermined value $\alpha$. If it is not smaller than $\alpha$, the processing routine proceeds to step 530, while, if it is smaller than $\alpha$, the processing skips over step 530 and proceeds to step 540.

On the other hand, in step 430, the counter P1 is reset.

In step 470, it is decided whether or not the value of the counter P2 is not smaller than a predetermined number of times (400 times in this embodiment). If it is smaller than the predetermined number of times, this routine is ended. If not so, the processing proceeds to step 480 where the counter P2 is reset. In other words, through the processing of the steps of 430 to 480, the misfire decision processing described later will be executed only when the vehicle continues to travel until the count of the counter P2 reaches the predetermined number of times.

In step 490, the value $CMIS_n$ of the tentative misfire counter for each cylinder, which is finally obtained by the incrementation on step 230 in FIG. 6, is read to calculate the summation value $\Sigma CMIS_n$ of this value [Specifically, $\Sigma CMIS_n = CMIS_1 + CMIS_2 + CMIS_3 + CMIS_4$, where $CMIS_n$ (n=1-4) is a count value of the tentative misfire counter $CMIS_n$ for each cylinder].

In step 500, it is decided whether or not the count value $\Sigma CMISn$ is not smaller than a predetermined value $\alpha$. If it is not smaller than $\alpha$; the processing proceeds to step 510. If it is smaller than $\alpha$, the processing proceeds to step 540. Incidentally, the predetermined value $\alpha$ is set beforehand in accordance with a required misfire occurrence rate. If it is desired to detect the misfire occurrence rate of 5% or more, the predetermined value $\alpha$ becomes 20, since the misfire decision of 400 times is made in this embodiment (400×0.05=20).

Thus, if the count value $\Sigma CMIS_n$ is smaller than predetermined value $\alpha$ in step 500, the processing described later is not executed under the decision that no cylinder misfires a predetermined number of times or more.

In step 510, the maximum value $MCMIS_n$ among the values of the tentative misfire counters $CMIS_n$ (n=1-4) set for the respective cylinders is compared with a predetermined value $\beta$. If $MCMIS_n \geq \beta$, the processing proceeds to step 520. If $MCMIS_n < \beta$, the processing proceeds to step 540. The predetermined value $\beta$ is set to a value (e.g. $\beta = \alpha \times 0.9$), which is slightly smaller than the above predetermined value $\alpha$, considering the number of times of erroneous decision that misfire has occurred in spite that no misfire has occurred actually.

In step 520, the values $NCMIS_n$s (there are three values in this embodiment) for the engine cylinders other than the cylinder the value of the tentative misfire counter of which has been decided to be the maximum value $MCMIS_n$, among the values of the tentative misfire counters for the respective engine cylinders are compared with a predetermined value $\gamma$. If all the values $NCMIS_n$ of the three values $CMIS_n$ of the tentative misfire counters $\leq \gamma$, the processing proceeds to step 530. If at least one of the values $MCMIS_n > \gamma$, the processing proceeds to step 40. In this embodiment, the predetermined value $\gamma$ is set on the basis of the magnitude of the above count value $\Sigma CMIS_n$, specifically, it is set by using a map shown in FIG. 10.

In the map shown in FIG. 10, X1, X2 and X3 represent the number of times of $\Sigma CMIS_n$, and there is a relation of X1 < X2 < X3, and with respect to the values of the predetermined value $\gamma$, there is a relation of $\gamma 1 < \gamma 2 < \gamma 3 < \gamma 4$. Further, the map of FIG. 10 shows that, as the value of the $\Sigma CMIS_n$ increases, the predetermined value $\gamma$ also increases. If $\gamma$ is set in this way, for example, upon making a comparison between the count values $\Sigma CMIS_n$ of 300 and 150, the above value $NCMIS_n$ for the former has a larger value than that for the latter. In this case, it becomes possible to prevent the value $NCMIS_n$ from becoming larger than the predetermined value $\gamma$ so that it shifts in the direction of making it difficult to detect occurrence of misfire.

Although $\gamma$ was set in the way as described above, it may be set in accordance with a difference between the predetermined values $\alpha$ and $\beta$ ($\gamma=\alpha-\beta$), and also it may be set in accordance with the above maximum value $MCMIS_n$.

In step 530, it is decided that the cylinder, the value of the tentative misfire counter $CMIS_n$ of which was decided to be the maximum value of the values of the $CMIS_n$ of the tentative misfire counters of the respective cylinders, surely has got into trouble and misfires, and thus the warning lamp 12, which informs a driver and others of the occurrence of misfire is caused to be lit.

In step 540, the tentative misfire counter $CMIS_n$ for each cylinder is reset ($CMIS_n \leftarrow 0$) to end this routine.

The processing shown in FIG. 7 and described above is a most characteristic part of the present invention which makes it possible to detect occurrence of misfire accurately. This processing will be explained hereunder in detail with reference to the drawings.

FIGS. 11A and 11B are graphs showing the values of the tentative misfire counters $CMIS_n$ for respective engine cylinders when a predetermined number of times (400 times in this embodiment) of misfire decision have been made. The abscissa represents the tentative misfire counters $CMIS_n$ for respective engine cylinders as well as respective cylinder numbers, and the ordinate represents the count values of the respective tentative misfire counters $CMIS_n$. FIG. 11B shows the characteristics when the vehicle travels on a rough road (but, no misfire occurs), and FIG. 11A shows the characteristics when misfire occurs.

It is seen from the figures that, when the vehicle travels on a rough road, the count values of the tentative misfire counters $CMIS_n$ become large values for all the cylinders, whereas, when misfire occurs, only the count values of the tentative misfire counters for specific cylinders (which misfire) have large values collectively.

Thus, in step 510, a maximum value $MCMIS_n$ among the values of the tentative misfire counters $CMIS_n$ for respective engine cylinders is compared with the predetermined value $\beta$, and further, in step 520, the values $NCMIS_n$ of the tentative misfire counters for the other cylinders are compared with the predetermined value $\gamma$. Therefore, the values $NCMIS_n$ of the tentative misfire counters (shown at $CMIS_2$, $CMIS_3$ and $CMIS_4$ in FIG. 11B) when the vehicle travels on a rough road become larger than the predetermined value $\gamma$. As a result, occurrence of misfire will not be erroneously decided to light the warning lamp 12.

Further, though not shown in the figures, at the time of abrupt acceleration of the vehicle, the engine speed changes $\Delta\omega$ for all the cylinders become large, so that the count values of the tentative misfire counters $CMIS_n$ for respective engine cylinders become large values, which is substantially the same with the characteristics shown in FIG. 11B when the vehicle travels on a rough road.

As understood from the above description, when the routines shown in FIGS. 6 and 7 are executed, even when engine speed changes $\Delta\omega_n$, are increased in spite that no misfire occurs at such a time when the vehicle is accelerated abruptly or it travels on a rough road, it becomes possible to prevent an erroneous decision from being made on the occurrence of misfire.

As a result, in the embodiment described above, when the vehicle speed is detected to be zero, no change in the average rotational speed $\omega_n$, which occurs when the vehicle travels on a rough road or it is accelerated abruptly, is not produced, and hence occurrence of misfire is detected only on the basis of a comparison between the count values $\Sigma CMIS_n$ and the predetermined value $\alpha$. For this reason, when the vehicle is travelling, occurrence of misfire can be detected only when specific cylinder(s) misfires collectively. Whereas, when the vehicle is in a stopped state, the above processing makes it possible to make a decision on misfire occurrence even in a case other than when specific engine cylinder(s) misfires collectively, in other words, when engine cylinders misfire randomly.

Figure 12:
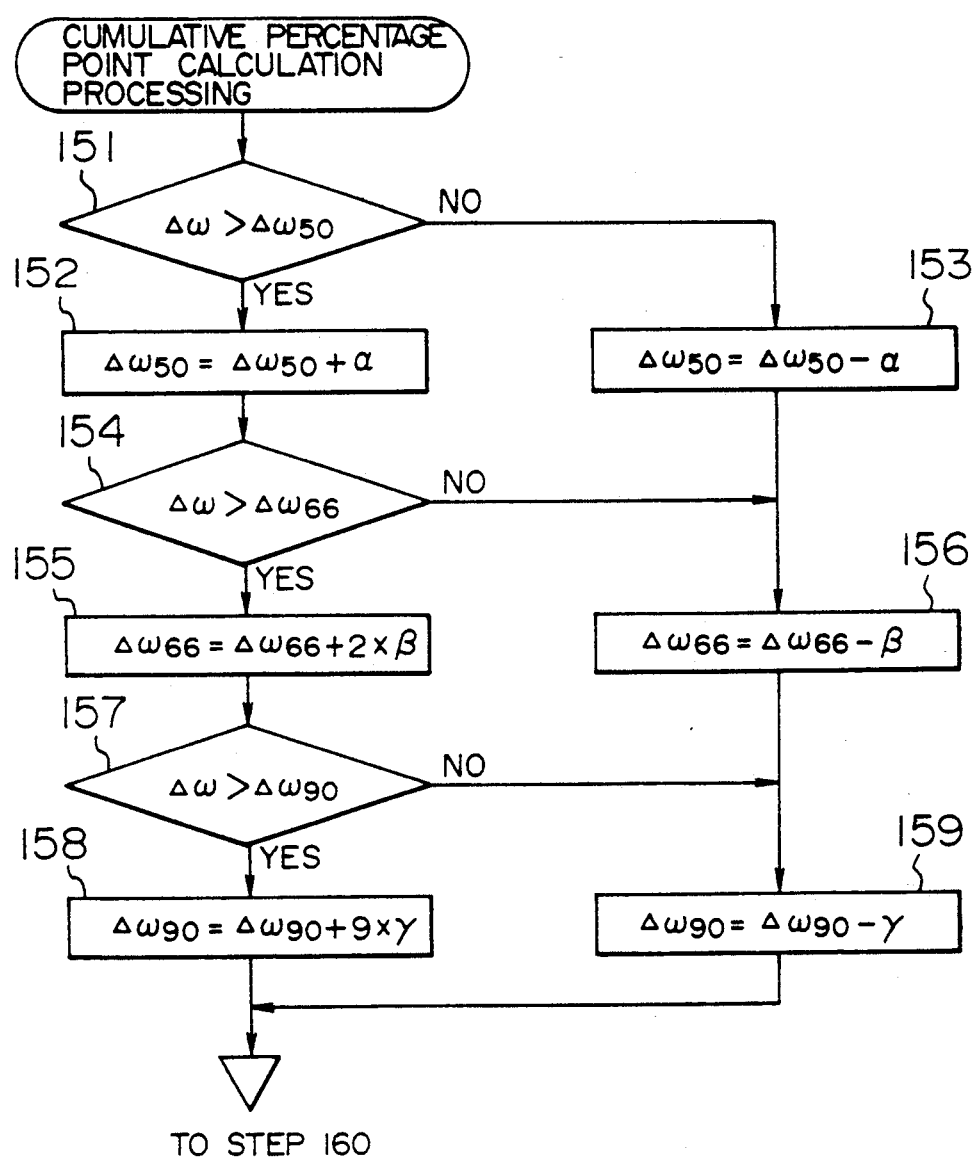
FIG. 12 is a flowchart for explaining the cumulative percent point calculating processing in the flowchart shown in FIG. 6.

FIG. 12 is a flowchart showing the processing executed in step 150 in the routine shown in FIG. 6.

In step 151, the present average rotational speed change $\Delta\omega_n$ is compared with a value $\Delta\omega_{50}$ for obtaining a cumulative 50 percentage point. If $\Delta\omega_n \geq \Delta\omega_{50}$, the processing proceeds to step 152. If $\Delta\omega_n < \Delta\omega_{50}$, the processing proceeds to step 153. The value $\Delta\omega_{50}$ is a value which is stored beforehand in the RAM 9c.

In step 152, a predetermined value $\alpha$ is added to $\Delta\omega_{50}$ to update $\Delta\omega_{50}$, while, in step 153, $\alpha$ is subtracted from $\Delta\omega_{50}$ to update $\Delta\omega_{50}$. Thus, the updated values $\Delta\omega_{50}$ can be made to settle at the cumulative 50 percentage point in the distribution of the average rotational speed changes $\Delta\omega_n$ for all the engine cylinders.

In step 154, the present average rotational speed change $\Delta\omega_n$ is compared with a value $\Delta\omega_{66}$ for obtaining a cumulative 66 percentage point. If $\Delta\omega_n > \Delta\omega_{66}$, the processing proceeds to step 155. If $\Delta\omega_n < \Delta\omega_{66}$, the processing proceeds to step 156. The value $\Delta\omega_{66}$ is a value which is also stored beforehand in the RAM 9c.

In step 155, a predetermined value $\beta$ multiplied by 2 is added to $\Delta\omega_{66}$ to update $\Delta\omega_{66}$, while, in step 156, $\beta$ is subtracted from $\Delta\omega_{66}$ to update $\Delta\omega_{66}$. Thus, the updated values $\Delta\omega_{66}$ can be made to settle at the cumulative 66 percentage point in the distribution of the average rotational speed changes $\Delta\omega_n$ for all the engine cylinders.

In step 157, the present average rotational speed change $\Delta\omega_n$ is compared with a value $\Delta\omega_{90}$ for obtaining a cumulative 90 percentage point. If $\Delta\omega_n \geq \Delta\omega_{90}$, the processing proceeds to step 158. If $\Delta\omega_n < \Delta\omega_{90}$, the processing proceeds to step 159. The value $\Delta\omega_{90}$ is a value which is also stored beforehand in the RAM 9c.

In step 158 a predetermined value $\gamma$ multiplied by 9 is added to $\Delta\omega_{90}$ to update $\Delta\omega_{90}$, while, in step 159, $\gamma$ is subtracted from $\Delta\omega_{90}$ to update $\Delta\omega_{90}$. Thus, the updated values $\Delta\omega_{90}$ can be made to settle at the cumulative 90 percentage point in the distribution of the average rotational speed changes $\Delta f_n$ for all the engine cylinders.

After the processing of these steps have been executed, the processing proceeds to step 160 in FIG. 6. In steps 160 and 170, the updated values $\Delta\omega_{50}$, $\Delta\omega_{66}$ and $\Delta\omega_{90}$ are read to calculate the first and second calculation values MF1 and MF2.

Figure 13:
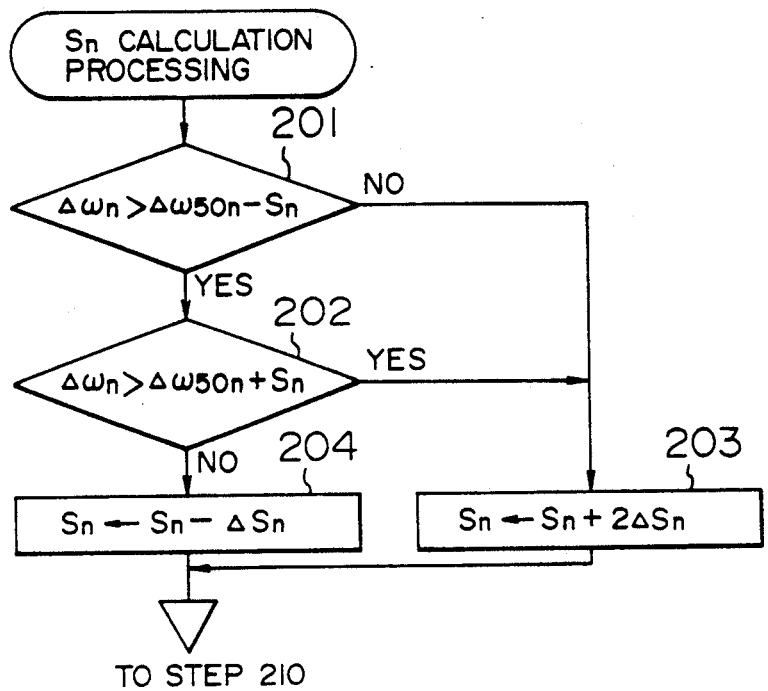
FIG. 13 is a flowchart for explaining the index $S_n$ calculating processing in the flowchart shown in FIG. 6.

FIG. 13 is a flowchart showing the calculation processing of the index $S_n$ for each cylinder in step 200 in FIG. 6. The change $\Delta\omega_{50n}$ represents the cumulative 50 percentage point in the distribution of the average rotational speed changes $\Delta\omega_n$. It can be obtained for each cylinder by the same processing as that of steps 151 to 153 in FIG. 12.

In step 201, it is decided whether or not the average rotational speed $\Delta\omega_n$ calculated in step 140 is larger than the difference $\Delta\omega_{50n} - S_n$ between the average rotational speed change $\Delta\omega_{50n}$ corresponding to the cumulative 50 percentage point and the index $S_n$. If $\Delta\omega_n \geq \Delta\omega_{50n} - S_n$, the processing routine proceeds to step 202. If $\Delta\omega_n < \Delta\int_{50n} - S_n$, the processing proceeds to step 203. In step 202, it is decided whether or not $\Delta\omega_n > \Delta\omega_{50n} + S_n$. If $\Delta\omega_n \geq \Delta\omega_{50n} + S_n$ holds, the processing proceeds to step 203, while, if $\Delta\omega_n < \Delta\omega_{50n} + S_n$ holds, the processing proceeds to step 204. In other words, if the condition $\Delta\omega_{50n} - S_n < \Delta\omega_n < \Delta\omega_{50n} + S_n$ is satisfied, the processing proceeds to step 204, while, if this condition is not satisfied, the processing proceeds to step 203.

In step 203, a predetermined value $\Delta S$ multiplied by 2 is added to the index $S_n$ to update the value of the index $S_n$. In step 204, the predetermined value $\Delta S$ is subtracted from the index $S_n$ to update the value of the index $S_n$.

Figure 14:
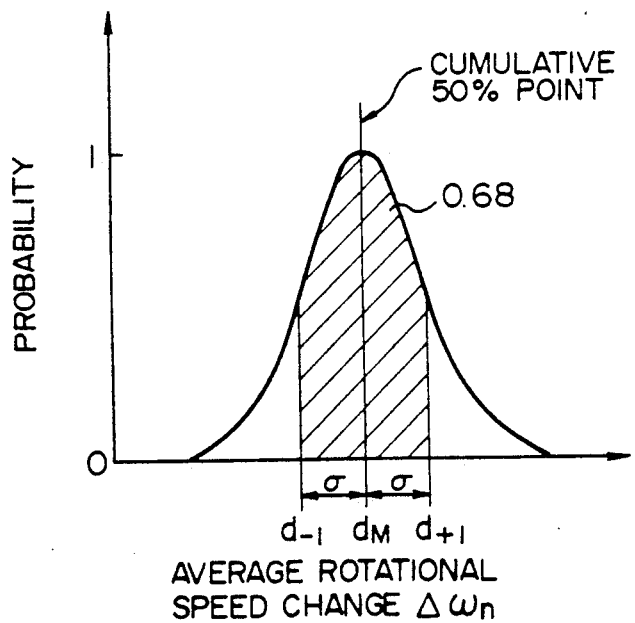
FIG. 14 is a characteristic diagram used for a detailed explanation of the flowchart shown in FIG. 13.

Through the execution of such processing steps, the index $S_n$ has a value corresponding to the standard deviation $\sigma$ in the distribution of the average rotational speed changes $\Delta\omega_n$. Referring to FIG. 14, the reason therefor will be explained hereunder.

Assuming, in the distribution of $\Delta\omega_n$ shown in FIG. 14, that a medium value (the cumulative 50 percentage point) in the distribution is represented by $d_M$, $-\sigma$ point ($\sigma$ is the standard deviation) is represented by $d_{-1}$, and $+\sigma$ point is represented by $d_{+1}$, the shaded area shown in FIG. 14 provides the probability of $d_{-1} < \Delta\omega_n < d_{+1}$ whose value is about 0.68.

On the other hand, through the processing of the routine shown in FIG. 13, the index $S_n$ is corrected so that the probability of satisfying the condition $\Delta\omega_{50n} - S_n < \omega_n < \Delta\omega_{50n} + S_n$ has a value of about 0.67 (67%).

Namely, an expected value K for the change in the index $S_n$ for each crank angle 120° CA is defined by the following equation (7), and the index $S_n$ converges to a value which renders the expected value K zero.

$$K = 2\Delta S \times \int_{-\infty}^{\omega_{50n} - S_n} P(V)dV + (-\Delta S) \times \quad (7)$$
$$\int_{\omega_{50n} - S_n}^{\omega_{50n} + S_n} P(V)dV + 2\Delta S \int_{\omega_{50n} + S_n}^{\infty} P(V)dV$$
$$= 2\Delta S \times \left\{ \frac{1}{2} \int_{\omega_{50n} - S_n}^{\omega_{50n}} P(V)dV \right\} + (-\Delta S) \times$$
$$\int_{\omega_{50n} - S_n}^{\omega_{50n} + S_n} P(V)dV \div 2\Delta S \times$$
$$\left\{ \frac{1}{2} \int_{\omega_{50n}}^{\omega_{50n} + S_n} P(V)dV \right\}$$
$$= 2\Delta S \times \left\{ -\int_{\omega_{50n} - S_n}^{\omega_{50n} + S_n} P(V)dV \right\} + 2\Delta S - \Delta S \times$$
$$\int_{\omega_{50n} - S_n}^{\omega_{50n} + S_n} P(V)dV = 0$$

In other words, by solving the equation (7) so that the expected value K in the range of $\Delta\omega_{50n} - S_n < \omega_n < \Delta\omega_{50n} + S_n$ is set to $\Delta S$ and that the expected value K in the other range is set to $2\Delta S$, the following equation (8) results:

$$\int_{\omega_{50n} - S_n}^{\omega_{50n} + S_n} P(V)dV = \frac{2}{3} \approx 0.67 \quad (8)$$

Thus, the index $S_n$ can be approximated to $\sigma$ ($S_n = \sigma$), and the execution of the processing of FIG. 13 gives a value of the index $S_n$ which corresponds to the standard deviation $\sigma$ in the distribution of the average rotational speed changes $\Delta\omega_n$.

Accordingly, since the misfire decision reference value REFn is obtained on the basis of the average rotational speed changes $\Delta\omega_n$ actually obtained as described above, i.e. by making use of the property of a combustion condition itself of an internal combustion engine, the misfire decision reference value REFn can be automatically updated to have a value adapted to the operating state of the internal combustion engine. For this reason, it is not necessary to provide beforehand a misfire decision reference value REFn having a value finely adjusted by considering a dispersion of the combustion characteristics of respective internal combustion engines or respective engine cylinders. Further, even if the combustion characteristics of an internal combustion engine changes with time, for example, it is possible to always obtain a correct misfire decision reference value. This is because the misfire decision reference value REFn is obtained by the use of a degree of dispersion (the index $S_n$) of the distribution of the actually obtained average rotational speed changes $\Delta\omega_n$ in a normal combustion state, so that the misfire decision reference value REFn is shifted with a change in the combustion characteristics of the internal combustion engine.

Further, in this embodiment, since the misfire decision reference value REFn can be obtained for each engine cylinder, it is possible to obtain a misfire decision reference value corresponding to the combustion characteristics of each engine cylinder and also to accurately detect which engine cylinder misfires.

Next, in this embodiment, the tentative misfire decision as to whether or not the internal combustion engine is now in a normal combustion state is made on the basis of the shape of the distribution of the average rotational speed changes $\Delta\omega_n$. However, the following method may also be adopted, though the accuracy of decision as to whether or not the internal combustion engine is in a normal combustion state is relatively reduced. This method will be explained hereunder as a second embodiment of the present invention.

Figure 15:
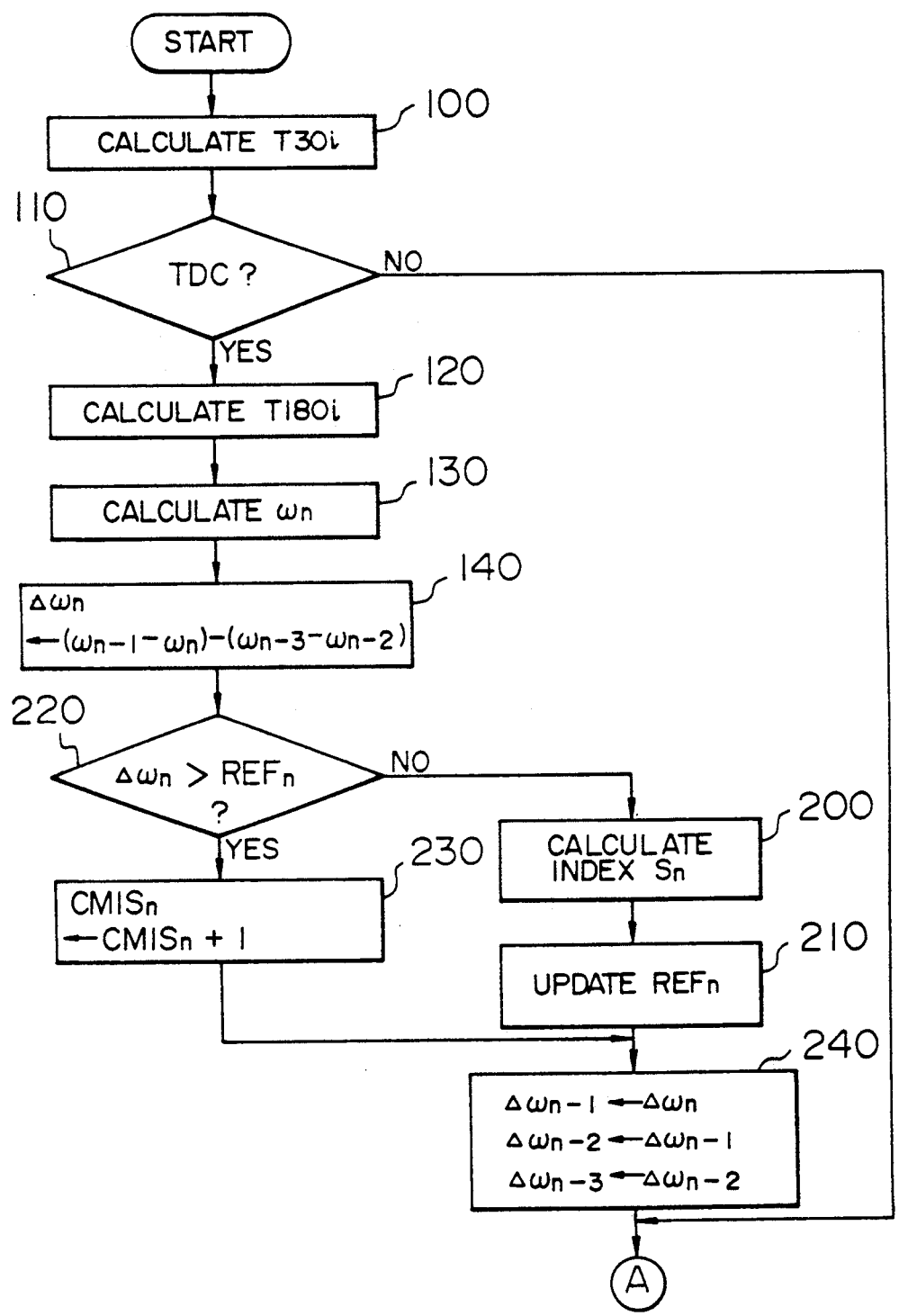
FIG. 15 is a flowchart for explaining the tentative misfire detecting operation according to a second embodiment of the present invention.

FIG. 15 is a flowchart showing the processing of updating a misfire decision reference value and the misfire decision processing according to the second embodiment. This flowchart is used in place of the flowchart for the tentative misfire decision shown in FIG. 6, this flowchart shows a routine in which an interruption processing is performed at every predetermined rotational angle (e.g. 30° CA). In FIG. 15, like reference numeral designates like processing in FIG. 6.

In FIG. 15, after such processings as described above have been executed at steps 100 to 140, the processing proceeds to step 220. In step 220, an average rotational speed change $\Delta\omega_n$ is compared with a misfire decision reference value $REF_n$ [which is calculated based on the above-described equation (6)] to make a misfire decision. If occurrence of misfire is decided, the processing proceeds to step 230. In step 230, the misfire counter CMISn is incremented as described above, and the processing proceeds to step 240. On the other hand, if occurrence of misfire is not decided, the processings of updating the misfire decision reference value in steps 200 and 210 are executed. That is, in this second embodiment, the decision (the step 190 in FIG. 6) as to whether or not the internal combustion engine 1 is now in a normal combustion state and the tentative misfire decision are made simultaneously.

By executing the processing described above, the misfire decision reference value REFn can be automatically set to a value adapted to the internal combustion engine. However, when the misfire decision reference value REFn set initially is not a tentatively adapted value, there is a problem that the misfire decision reference value REFn may be updated in an erroneous direction. Therefore, it is preferable to decide whether or not the internal combustion engine is in a normal combustion state by using the method described in the first embodiment shown in FIG. 6.

Further, in the above first and second embodiments, the misfire decision reference value REFn is updated on the basis of a dispersion of the distribution of the average rotational speed changes $\Delta\omega_n$ when the internal combustion engine is in a normal combustion state. However, the misfire decision reference value REFn may always be updated without being restricted to the case where the internal combustion engine is in a normal combustion state, although there is a problem that the misfire decision reference value may be set to a value which is somewhat too large.

In the above embodiments, the misfire decision reference value was obtained on the basis of the standard deviation of the distribution $\sigma$ detected as an index indicative of the degree of dispersion of the distribution, but it may be obtained by detecting the points of $2\sigma$ and $3\sigma$.

In the above embodiments, the misfire decision reference value REFn was set for each cylinder, but a single misfire decision reference value may be set in common with all the cylinders, and it may be updated by the method as described above.

Further, in the above embodiments, the misfire decision reference value to be used in the tentative misfire decision was obtained on the basis of an index indicative of the degree of dispersion of the distribution. However, the tentative misfire decision may be made directly on the basis of an index indicative of the degree of dispersion of the distribution, as done in a third embodiment shown in FIG. 16 and described hereunder.

Figure 16:
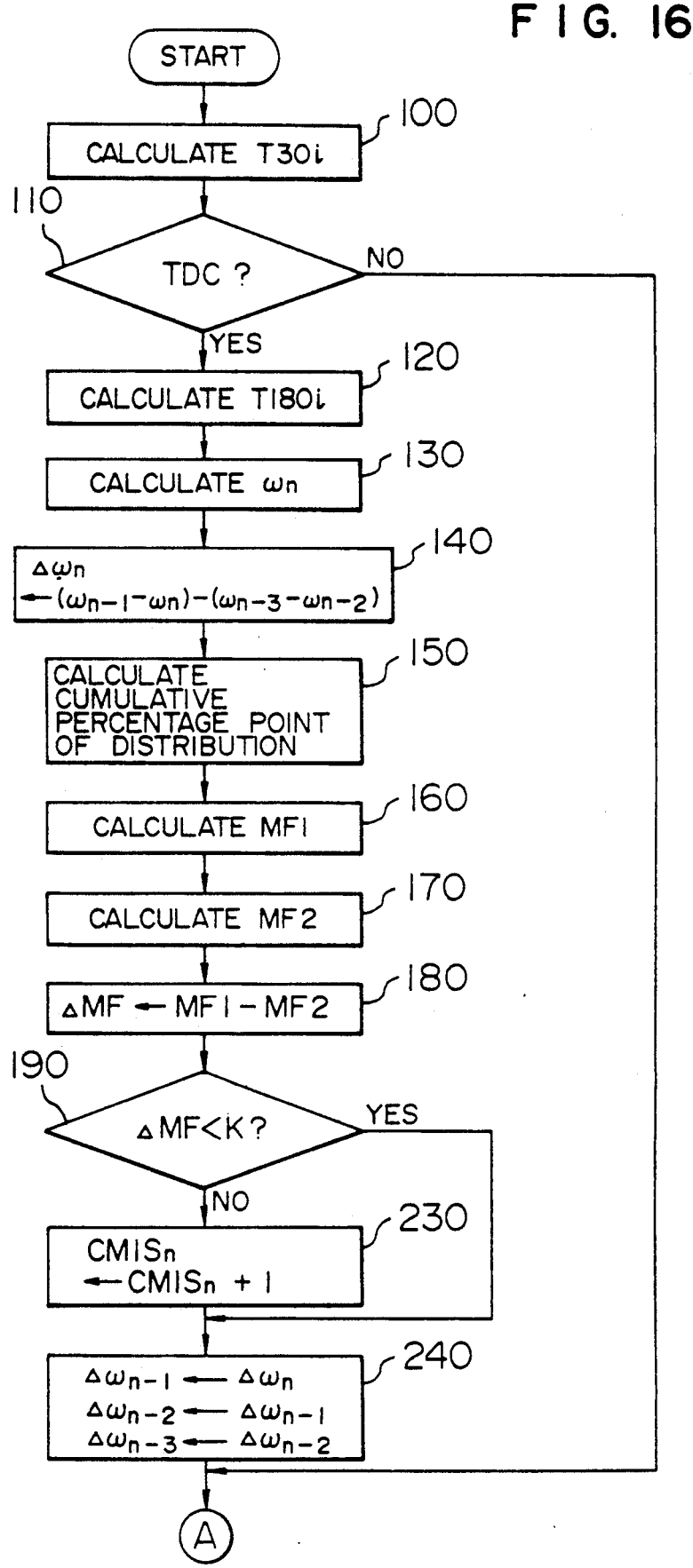
FIG. 16 is a flowchart for explaining the tentative misfire detecting operation according to a third embodiment of the present invention.

FIG. 16 is a flowchart for making a tentative misfire decision which is used in place of the flowchart shown in FIG. 6. The flowchart of FIG. 16 does not include steps 200 to 220 in FIG. 6.

In step 190, if the difference $\Delta$MF is smaller than a predetermined value K, it is decided that the internal combustion engine does not misfire, on the ground as described hereinbefore, and the processing skips over step 230 and proceeds to step 240. While, if the difference $\Delta$MF is not smaller than the predetermined value K, it is decided that the internal combustion engine misfires, and the processing proceeds to step 230. Here, the predetermined value K has a value near zero for the reason described above.

As described above, in the third embodiment, three cumulative percentage points (the cumulative 50, 66 and 90 percentage points) of the distribution of the average rotational speed changes $\Delta\omega_n$ are detected, and if a change rate from the cumulative 50 percentage point to the cumulative 66 percentage point is different from that from the cumulative 66 percentage point to the cumulative 90 percentage point, it is decided that the internal combustion engine 1 misfires. Therefore, there is no necessity to set a misfire decision reference value. Thus, a misfire decision can be made without requiring to perform complicated processings of obtaining the misfire decision reference value adapted to the combustion characteristics of the internal combustion engine.

In the first and third embodiments, the average rotating speed changes $\Delta\omega_n$ corresponding to the cumulative 50, 66 and 90 percentage points were detected to calculate the first calculation value MF1 and the second calculation value MF2, but any three other cumulative percentage points may be detected and used to make a decision on occurrence of misfire by the above-described method.

In the first and third embodiments, three cumulative percentage points were detected, but four cumulative percentage points may be detected to decide occurrence of misfire on the basis of ratios of the respective values of the four cumulative percentage points and the value of the cumulative 50 percentage point. Although, as a result of the detection of four or more cumulative percentage points, the processings of detecting the values of the respective cumulative percentage points become more complicated, misfire occurring in the internal combustion engine can be detected more accurately.

In the above embodiments, it is decided that a specific engine cylinder misfires, when the value of the tentative misfire counter $CMIS_n$ for a certain engine cylinder has become large concentratedly. In this case, when only a single cylinder misfires, a decision on misfire occurrence can be made, but when a plurality of (e.g. two) cylinders misfire, a decision on misfire occurrence cannot be made. A method of solving such a problem will be explained hereunder as a fourth embodiment.

Figure 17:
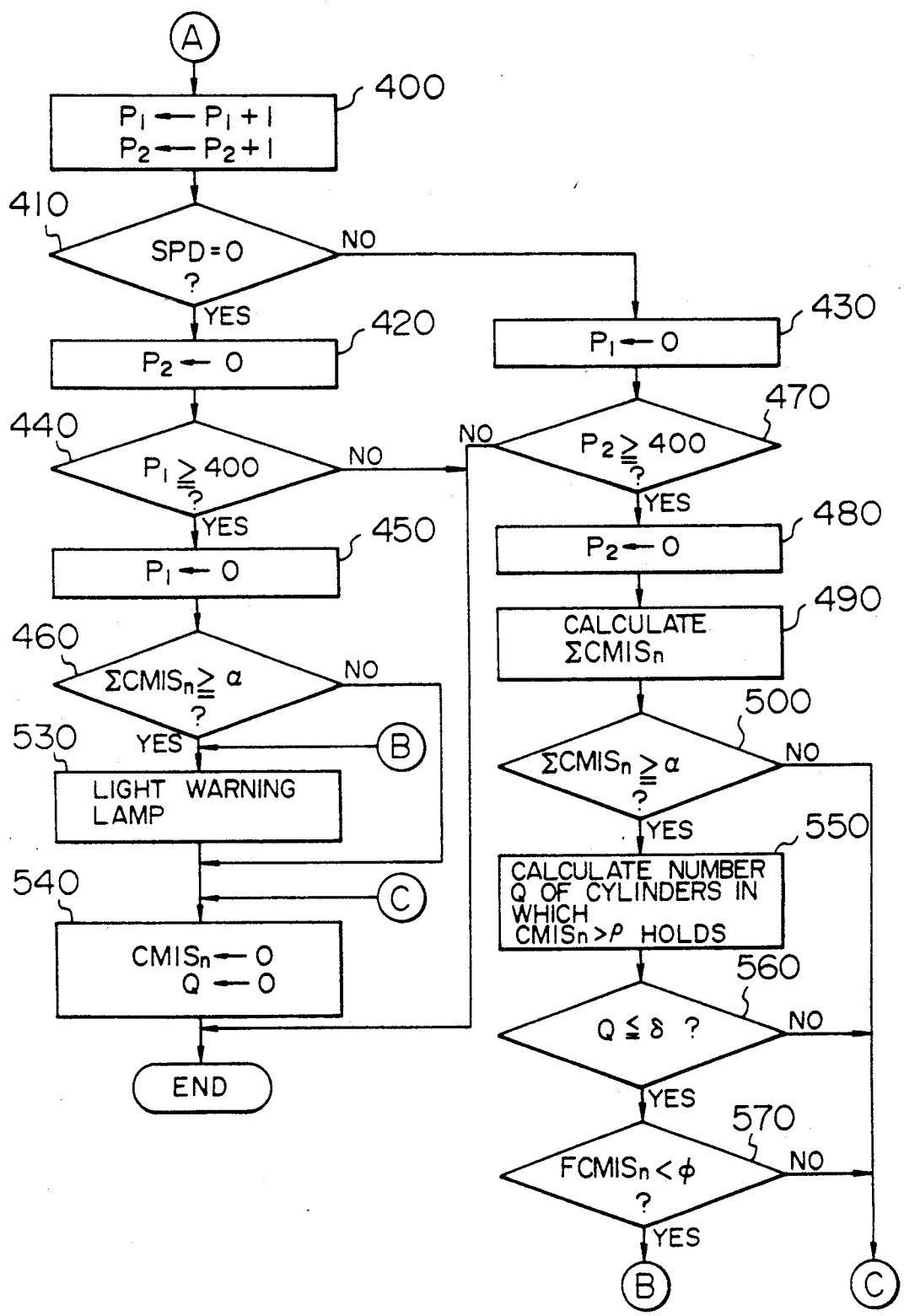
FIG. 17 is a flowchart for explaining the real misfire detecting operation according to a fourth embodiment of the present invention.

FIG. 17 is a flowchart showing the misfire decision processing according to the fourth embodiment. The flowchart of FIG. 17 is a routine for making a real misfire decision which is used in place of the flowchart of FIG. 7. In FIG. 17, like reference numeral refers to like processing steps in FIG. 7 whose explanation will be omitted here.

The routine of FIG. 17 differs from that of FIG. 7 at steps 550 to 570. In step 550, the number Q of engine cylinders, in which the value of the tentative misfire counter $CMIS_n$ becomes larger than a predetermined value $\rho$, is obtained. The predetermined value $\rho$ is determined from the relation of a predetermined value $\alpha \div$ the number k of engine cylinders in which the detection of misfire occurrence is desired. Since this embodiment intends to detect misfire occurring in one or two engine cylinders, k=2 results, and hence the predetermined value $\rho$ becomes $\alpha/2$.

In step 560, the number Q of engine cylinders is compared with a predetermined value $\delta$. If Q $\geq \delta$, the processing proceeds to step 540. If Q $< \delta$, the processing proceeds to step 570. The predetermined value $\delta$ is set on the basis of a plural number of engine cylinders in which the detection of misfire occurrence is desired. For example, when the detection of misfire occurring in one or two engine cylinders is desired, $\delta = 2$ results.

In step 570, the value(s) of the tentative misfire counter(s) $FCMIS_n$ for respective engine cylinders other than the engine cylinder(s), in which the value(s) of the misfire counter(s) $CMIS_n$ has been detected to have a value larger than the predetermined value $\rho$ in step 550, is compared with a predetermined value $\Phi$. If $FCMIS_n \geq \Phi$, the processing proceeds to step 540. If $FCMIS_n < \Phi$, the processing proceeds to step 530. The predetermined value $\Phi$ corresponds to the predetermined value $\gamma$ described above, and the predetermined value $\Phi$ is set in the same manner as that o( the predetermined value $\gamma$.

In step 530, based on a decision that the cylinder, in which step 550 has determined that the value of the tentative misfire counter $CMIS_n$ has become larger than $\rho$, misfires, the warning lamp 12 is lit. In this case, the display manner of the warning lamp 12 may be changed (e.g. the lighting interval is changed) depending on the number Q of engine cylinders obtained in step 550, whereby a driver or others may be informed of misfire occurring in one or two engine cylinders discriminably.

In step 540, the value of the tentative misfire counter $CMIS_n$ and the number Q of engine cylinders are reset, and this routine ends.

FIG. 18 is a graph showing the characteristics of the tentative misfire counter $CMIS_n$ when two engine cylinders have misfired. It can be seen that, like the characteristics of the case where a single engine cylinder has misfired as shown in FIG. 11A, the values of the tentative misfire counters $CMIS_n$ for respective engine cylinders other than the cylinders, in which misfire has occurred, becomes smaller than the predetermined value $\Phi$. Therefore, even by the execution of the above processings, it can be accurately decided whether or not an erroneous decision of misfire occurrence has been made when a vehicle is travelling on a rough road or whether or not misfire has occurred in a plurality of engine cylinders.

A decision of real misfire occurrence can be made on the basis of the state of dispersion of the number of times of misfire decision for respective engine cylinders made during a predetermined period of time. This will be explained with respect to a fifth embodiment shown in FIG. 19.

Figure 19:
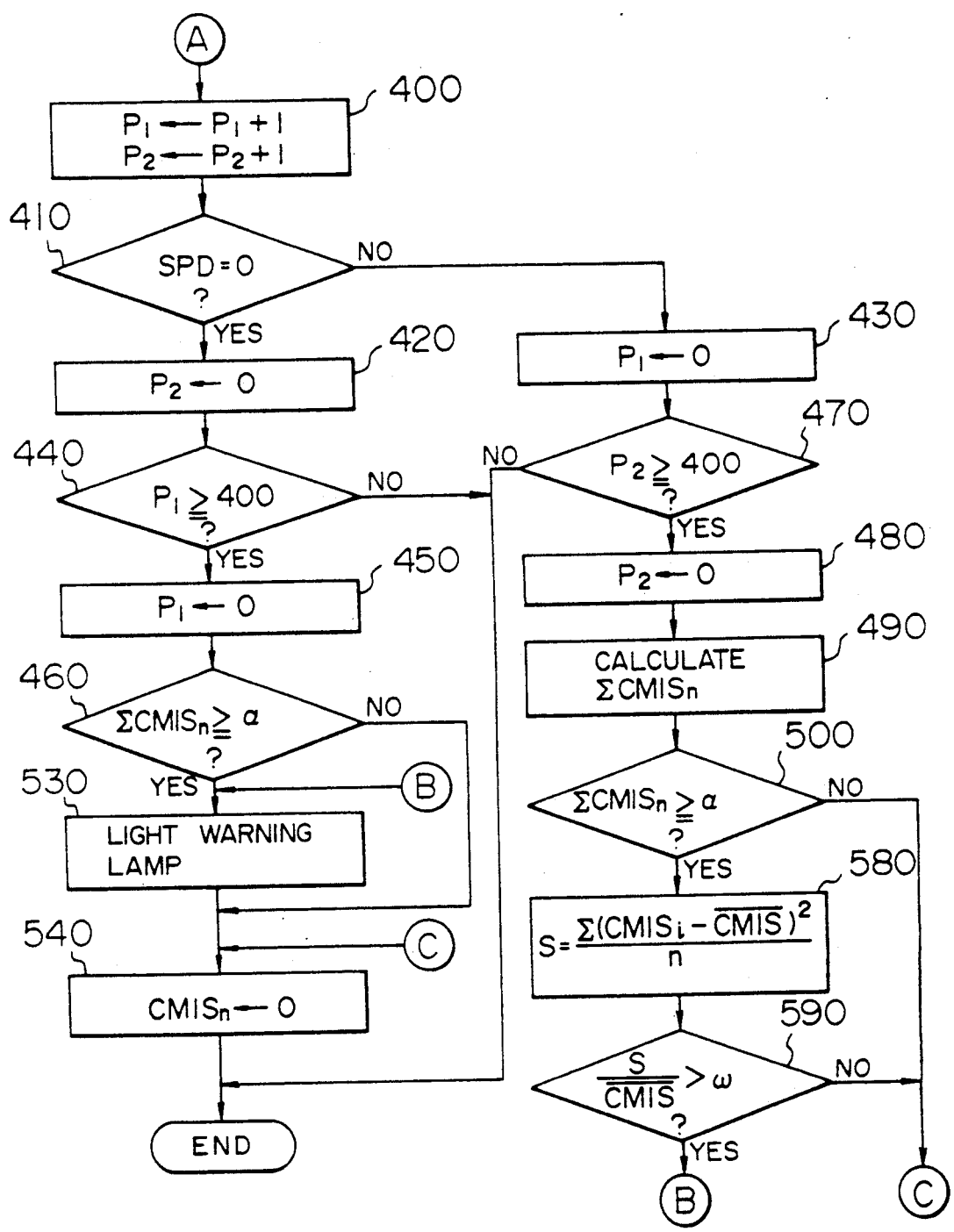
FIG. 19 is a flowchart for explaining the real misfire detecting operation according to a fifth embodiment of the present invention.

FIG. 19 is a flowchart showing the routine which is used in place of the flowchart of FIG. 7. In FIG. 19, like reference numerals refer to like processing steps in FIG. 7, and an explanation thereof will be omitted. The routine of FIG. 19 differs from that of FIG. 7 in steps 580 to 590. In step 580, the dispersion S of the number of times $CMISn$ of misfire decision for respective engine cylinders can be calculated by the following equation (9)

$$S = \frac{\Sigma (CMISi - \overline{CMIS})^2}{n} \quad (9)$$

Next, in step 590, a normalized value of S is obtained by dividing S by an average value of the values of the misfire counters CMIS, and the resultant normalized value of S is compared with a predetermined value $\omega$. If the normalized value of S is not larger than $\omega$, the processing proceeds to step 540. If the former is larger than the latter, it is decided that misfire has occurred, and the processing proceeds to step 530, where the warning lamp 12 is lit.

FIG. 20 shows the values obtained by the normalization of S under several conditions. As shown in FIG. 20, by the use of the normalized values of the dispersion S of the number of times of misfire decision for respective engine cylinders, it becomes possible to provide clear and sufficient differences between the rough road travelling state (x marks), the random engine cylinder misfire occurrence (o marks) and the specific engine cylinder misfire occurrence ($\Delta$ marks). By setting predetermined values $\omega$ therebetween, it becomes possible to surely prevent an erroneous decision of misfire occurrence from being made in a rough road travelling state, so that all misfire patterns including the random engine cylinder misfire occurrence can be detected accurately.

In the first to fifth embodiments, a misfire decision was made by comparing the changes $\Delta\omega_n$ in the average rotational speed which are obtained from the rotational speeds $\omega_n$ for respective engine cylinders, with the misfire decision reference value. However, as disclosed in JP-A-58-19532, the misfire decision can be made by any other method which, for example, compares an instantaneous rotational speed after the expansion stroke of each engine cylinder with that before the expansion stroke thereof.

Further, in the first to fifth embodiments, in the routine of the real misfire decision, when a vehicle is in a stopped state, misfire was detected only by making a comparison of the count value $\Sigma CMIS_n$ with a predetermined value $\alpha$ in steps 420 to 460. Instead, the processings of steps 410 to 460 may be omitted, and the processing of step 430 and the following may be performed also when the vehicle is in a stopped state.

As described above, in accordance with the present invention, a predetermined number of times of tentative misfire decisions are made, and thereafter it is decided that misfire has actually occurred in a multicylinder internal combustion engine when only a part of the counting results of tentative misfire decisions for respective engine cylinders is larger than a predetermined number of times. By virtue of the above-described manner of misfire decision, the present invention has a meritorious effect of preventing an erroneous decision to decide that misfire has occurred from being made when a vehicle travels on a rough road, thereby elevating misfire detection accuracy.

Further, the present invention has a further meritorious effect in that, after making a predetermined number of times of misfire decision by the use of previously known misfire decision methods, a simple processing is added in which the decision results are counted for respective engine cylinders, and then a misfire decision is made based on the counting results.

We claim:

1. A misfire detecting apparatus for a multicylinder internal combustion engine comprising:
    rotary signal outputting means for outputting a rotary signal at every predetermined rotary angle in accordance with the rotation of a multicylinder internal combustions engine;
    tentative misfire deciding means for tentatively deciding, for each cylinder, whether or not misfire has occurred in said multicylinder internal combustion engine on the basis of the output signal from said rotary signal outputting means;
    counting means for counting, for each cylinder, the number of tentative misfires decided by said tentative misfire deciding means;
    counting result storage means for storing, for each cylinder, a counting result of said counting means; and real misfire deciding means for deciding, after a given number of tentative misfire decisions, that misfire has actually occurred only if the counting result, for a part of the cylinders, among the counting results for respective cylinders stored in said counting result storage means is larger than a predetermined number.

2. A misfire detecting apparatus for a multi-cylinder internal combustion engine according to claim 1, wherein said tentative misfire deciding means comprises:
rotational speed change calculating means for detecting a rotational speed of said internal combustion engine on the basis of the rotary signal from said rotary signal outputting means to calculate changes of the rotational speed;
index calculating means for calculating an index indicative of a degree of dispersion of a distribution shape of a plurality of calculation results obtained by said rotational speed change calculating means when said internal combustion engine rotates by a third predetermined number of times of rotation;
misfire decision reference value producing means for producing a misfire decision reference value on the basis of a calculation result of said index calculating means;
misfire deciding means for tentatively deciding whether or not misfire has occurred in said internal combustion engine by comparing the calculation results of said rotational speed change calculating means with the misfire decision reference value.

3. A misfire detecting apparatus for a multicylinder internal combustion engine according to claim 2, wherein the index is a value corresponding to the standard deviation of the distribution.

4. A misfire detecting apparatus for a multi-cylinder internal combustion engine according to claim 2, wherein said misfire decision reference value producing means comprises:
normal distribution shape deciding means for deciding whether or not the distribution shape of a plurality of calculation results obtained by said rotational speed change calculating means when said internal combustions engine rotates by a third predetermined number of times of rotation is a normal distribution shape; and
misfire decision reference value updating means for updating the misfire decision reference value when said normal distribution shape deciding means has decided that the distribution shape is a normal distribution shape.

5. A misfire detecting apparatus for a multi-cylinder internal combustion engine according to claim 4, wherein said normal distribution shape deciding means detects at least three cumulative percentage points in the distribution to decide the normal distribution shape on the basis of ratios between the values of the detected cumulative percentage points.

6. A misfire detecting apparatus for a multi-cylinder internal combustion engine according to claim 1, wherein said tentative misfire deciding means comprises:
rotational speed change calculating means for detecting a rotational speed of said internal combustion engine on the basis of the rotary signal from said rotary signal outputting means to calculate changes of the rotational speed;

misfire detecting means for tentatively deciding that misfire has occurred in said internal combustion engine if the distribution shape of a plurality of calculation results obtained by said rotational speed change calculating means when said internal combustion engine rotates by a third predetermined number of times of rotation is not a normal distribution shape.

7. A misfire detecting apparatus for a multi-cylinder internal combustion engine according to claim 6, wherein said misfire detecting means detects at least three cumulative percentage points in the distribution to tentatively decide that misfire has occurred in said internal combustion engine on the basis of ratios between the values of the detected cumulative percentage points.

8. A misfire detecting apparatus for a multicylinder internal combustion engine according to claim 1, wherein said real misfire deciding means comprises:
all cylinder number-of-times-of-misfire totaling means for totaling all values of the counting results of said counting means for the respective cylinders;
first decision means for deciding whether or not the totaled number of counting results is not smaller than a first predetermined value;
second decision means for deciding whether or not a maximum value of the counting results for the respective cylinders is not smaller than a second predetermined value which has been set to a value smaller than the first predetermined value; and
third decision means for deciding whether or not the values for all the cylinders other than the cylinder providing the maximum value are not larger than a third predetermined value which has been set to a value sufficiently smaller than the second predetermined value,
wherein if the decision results of said first to third decision means are all YES, it is decided that misfire has actually occurred.

9. A misfire detecting apparatus for a multicylinder internal combustion engine according to claim 1, wherein said real misfire decision means comprises:
all cylinder number-of-times-of-misfire totaling means for totaling all values of the counting results of said counting means for the respective cylinders;
first decision means for deciding whether or not the totaled number of counting results is not smaller than a first predetermined value;
misfiring cylinder number calculating means for calculating a number of cylinders providing counting results which are not smaller than a second predetermined value that has been set to a value smaller than the first predetermined value;
second decision means for deciding whether or not the number of cylinders calculated by said misfiring cylinder number calculating means is not larger than a third predetermined value;
third decision means for deciding whether or not the values for all the cylinders other than the cylinders providing counting results which are into smaller than the second predetermined value are smaller than a fourth predetermined value which has been set to a value sufficiently smaller than the second predetermined value,
wherein if the decision results of said first, second and third decision means are all YES, it is decided that misfire has actually occurred.

10. A misfire detecting apparatus for a multicylinder internal combustion engine according to claim 1, wherein said real misfire decision means comprises:

all cylinder number-of-times-of-misfire totaling means for totaling all values of the counting results of said counting means for the respective cylinders;

first decision means for deciding whether or not the totaled number of counting results is not smaller than a first predetermined value;

dispersion calculating means for calculating dispersion of the number of times of tentative misfires for the respective cylinders; and second decision means for deciding whether or not a normalized value of the dispersion is not smaller than a second predetermined value, wherein if the decision results of said first and second decision means are all YES, it is decided that misfire has actually occurred.

11. A misfire detecting apparatus for a multi-cylinder internal combustion engine comprising:

vehicle stop detecting means for detecting whether or not a vehicle is in a stopped state;

rotary signal outputting means for outputting a rotary signal at every predetermined rotary angle in accordance with the rotation of a multicylinder internal combustion engine;

tentative misfire deciding means for tentatively deciding, for each cylinder, whether or not misfire has occurred in said multicylinder internal combustion on the basis of the output signal form said rotary signal outputting means;

counting means for counting, for each cylinder, the number of tentative misfires decided by said tentative misfire deciding means;

counting result storage means for storing, for each cylinder, a counting result of said counting means; and real misfire deciding means for deciding, in a state where the vehicle is not in a stopped state and after a given number of tentative misfire decisions, that misfire has actually occurred only if the counting result, for a part of the cylinders, among the counting results for respective cylinders stored in said counting result storage means is larger than a first predetermined number, and for deciding, in a state where the vehicle is in a stopped state, that misfire has actually occurred if the counting result, for at least one cylinder, among the counting results for respective cylinders stored in said counting result storage means is larger than a second predetermined number.

12. A misfire detecting apparatus for an internal combustion engine comprising:

rotary signal outputting means for outputting a rotary signal at every predetermined rotary angle in accordance with the rotation of an internal combustion engine;

rotational speed change calculating means for detecting a rotational speed of said internal combustion engine on the basis of the rotary signal from said rotary signal outputting means and calculating changes of the rotational speed of said internal combustion engine; and misfire detecting means for deciding that misfire has occurred in said internal combustion engine, if a shape of the distribution of a plurality of calculation results obtained by said rotational speed change calculating means when said internal combustion engine rotates by a predetermined number of times of rotation is not a normal distribution shape.

13. A misfire, detecting apparatus for an internal combustion engine comprising:

rotary signal outputting means for outputting a rotary signal at every predetermined rotary angle in accordance with the rotation of an internal combustion engine;

rotational speed change calculating means for detecting a rotational speed of said internal combustion engine on the basis of the rotary signal from said rotary signal outputting means and calculating changes of the rotational speed of said internal combustion engine;

index calculating means for calculating an index indicative of a degree of dispersion of a distribution shape of a plurality of calculation results obtained by said rotational speed change calculating means when said internal combustion engine rotates by a predetermined number of times of rotation;

misfire decision reference value producing means for producing a misfire decision reference value on the basis of a calculation result of said index calculating means; and misfire deciding means for deciding whether or not misfire has occurred in said internal combustion engine by comparing the calculation results of said rotational speed change calculating means with the misfire decision reference value.

* * * * *